United States Patent
Wu et al.

(10) Patent No.: US 11,290,168 B2
(45) Date of Patent: Mar. 29, 2022

(54) METHOD AND DEVICE FOR TRANSMITTING AND RECEIVING CHANNEL STATE INFORMATION, COMMUNICATION NODE, AND STORAGE MEDIUM

(71) Applicant: XI'AN ZHONGXING NEW SOFTWARE CO., LTD., Xi'an (CN)

(72) Inventors: Hao Wu, Shenzhen (CN); Guozeng Zheng, Shenzhen (CN); Huahua Xiao, Shenzhen (CN); Yong Li, Shenzhen (CN); Zhaohua Lu, Shenzhen (CN); Yu Ngok Li, Shenzhen (CN)

(73) Assignee: XI'AN ZHONGXING NEW SOFTWARE CO., LTD., Shenzhen (CN)

( * ) Notice: Subject to any disclaimer, the term of this patent is extended or adjusted under 35 U.S.C. 154(b) by 0 days.

(21) Appl. No.: 17/267,770

(22) PCT Filed: Aug. 10, 2019

(86) PCT No.: PCT/CN2019/100105
§ 371 (c)(1),
(2) Date: Feb. 10, 2021

(87) PCT Pub. No.: WO2020/030160
PCT Pub. Date: Feb. 13, 2020

(65) Prior Publication Data
US 2021/0175952 A1   Jun. 10, 2021

(30) Foreign Application Priority Data
Aug. 10, 2018   (CN) .......................... 201810912169.2

(51) Int. Cl.
  H04B 7/02        (2018.01)
  H04B 7/06        (2006.01)
  H04B 7/0456      (2017.01)

(52) U.S. Cl.
  CPC ......... *H04B 7/0626* (2013.01); *H04B 7/0456* (2013.01)

(58) Field of Classification Search
  CPC .. H04B 7/0626; H04B 7/0456; H04B 7/0663; H04B 7/0413; H04B 7/0486
  (Continued)

(56) References Cited

U.S. PATENT DOCUMENTS 8,116,391 B2 *  2/2012  Mielczarek .......... H04B 7/0658
                                                    375/260
8,761,283 B2 *  6/2014  Ponnampalam ..... H04B 7/0663
                                                    375/260
(Continued)

FOREIGN PATENT DOCUMENTS

| CN | 101631004 | 1/2010 |
| CN | 107682063 | 2/2018 |
| WO | WO 2007/050860 | 5/2007 |

OTHER PUBLICATIONS

Nortel "Differential Feedback for LTE Downlink Closed-Loop MIMO" 3GPP TSG-RAN Working Group 1 Meeting #48bis, St. Julian's, Malta, Mar. 26-30, 2007, R1-071452.
(Continued)

*Primary Examiner* — Helene E Tayong
(74) *Attorney, Agent, or Firm* — Knobbe, Martens, Olson & Bear LLP

(57) ABSTRACT

Provided are a method and apparatus for transmitting and receiving channel state information, a communication node, and a storage medium. A CSI matrix H is decomposed to obtain a vector group, where the vector group comprises at least two vector matrices, element information of at least one
(Continued)

vector matrix in the vector group is quantized, and the quantized element information is transmitted.

18 Claims, 3 Drawing Sheets

(58) Field of Classification Search
USPC .......................................................... 375/267
See application file for complete search history.

(56) References Cited

U.S. PATENT DOCUMENTS

| | | | |
|---|---|---|---|
| 2011/0111747 A1* | 5/2011 | Tosato | H04B 7/0626 455/422.1 |
| 2011/0170638 A1 | 7/2011 | Yuan et al. | |
| 2012/0033566 A1* | 2/2012 | Porat | H04L 25/03343 370/252 |
| 2018/0076871 A1 | 3/2018 | Rahman et al. | |
| 2018/0091272 A1* | 3/2018 | Wang | H04B 7/0626 |
| 2018/0241444 A1* | 8/2018 | Ao | H04B 7/0626 |
| 2020/0083937 A1* | 3/2020 | Rahman | H04B 7/0478 |

OTHER PUBLICATIONS

Tokyo Institute of Technology "Hybrid feedback and precoding for MU-MIMO & JT-CoMP" 3GPP TSG RAN WG1 Meeting #60, San Francisco, Feb. 22-26, 2010, R1-101290.

International Search Report for PCT/CN2019/100105 dated Oct. 31, 2019.

Russian Office Action dated Aug. 27, 2021 for Russian Patent Application No. 2021105672/07(012348). 10 pages with translation.

Chinese First Search Report dated Oct. 27, 2021 for Chinese Patent Application No. 201810912169.2.

Chinese Office Action dated Nov. 3, 2021 for Chinese Patent Application No. 201810912169.2.

\* cited by examiner

METHOD AND DEVICE FOR TRANSMITTING AND RECEIVING CHANNEL STATE INFORMATION, COMMUNICATION NODE, AND STORAGE MEDIUM

CROSS-REFERENCE TO RELATED APPLICATIONS

This is a National Stage Application, filed under 35 U.S.C. 371, of and claims priority to International Patent Application No. PCT/CN2019/100105, filed on Aug. 10, 2019, which claims priority to Chinese Patent Application No. 201810912169.2 filed on Aug. 10, 2018, the disclosures of both of which are incorporated herein by reference in their entireties.

TECHNICAL FIELD

Embodiments of the present disclosure relate to, but is not limited to, the field of communications technologies and, in particular, relate to, but is not limited to, a method and apparatus for transmitting and receiving channel state information (CSI), a communication node, and a storage medium.

BACKGROUND

In a multiple input multiple output (MIMO) wireless communication system, multiple transmit antennas are subjected to precoding or beamforming, thereby implementing the purpose of improving transmission efficiency and reliability.

In order to implement high-performance precoding or beamforming, a precoding matrix or a beamforming vector needs to be well-matched with a channel, which requires that a transmit end can smoothly obtain channel state information (CSI). Therefore, CSI feedback is a key technology for implementing high-performance precoding or beamforming in the MIMO system. In the wireless communication system in the related art, the quantitation and feedback are usually performed directly on elements in a CSI matrix, and the CSI is fed back in a single manner.

SUMMARY

The embodiments of the present disclosure provide a method and apparatus for transmitting and receiving CSI, a communication node, and a storage medium to implement the quantitation and feedback and enrich the quantitation and feedback manners of CSI.

The embodiments of the present disclosure provide a method for transmitting CSI. The method includes the steps described below.

A first communication node decomposes a CSI matrix H to obtain a vector group, where the vector group includes at least two vector matrices.

Element information of at least one vector matrix in the vector group is quantized.

The quantized element information is transmitted.

The embodiments of the present disclosure further provide a method for receiving CSI. The method includes the steps described below.

A second communication node receives quantized element information, where the element information is information corresponding to an element in at least one vector matrix in a vector group obtained by decomposing by a first communication node a CSI matrix H, and the vector group includes at least two vector matrices.

The quantized element information is restored to obtain the CSI matrix H.

The present disclosure further provides an apparatus for transmitting CSI. The apparatus includes a decomposition module, a quantization module, and a transmission module.

The decomposition module is configured to decompose a CSI matrix H to obtain a vector group, where the vector group includes at least two vector matrices.

The quantization module is configured to quantize element information of at least one vector matrix in the vector group.

The transmission module is configured to transmit the quantized element information.

The present disclosure further provides an apparatus for receiving CSI. The apparatus includes a receiving module and a restoring module.

The receiving module is configured to receive quantized element information, where the element information is information corresponding to an element in at least one vector matrix in a vector group obtained by decomposing a CSI matrix H, and the vector group includes at least two vector matrices.

The restoring module is configured to restore the quantized element information to obtain the CSI matrix H.

The present disclosure further provides a communication node. The communication node includes a processor, a memory, and a communication bus.

The communication bus is configured to implement connection and communication between the processor and the memory, the processor is configured to execute one or more first computer programs stored in the memory to implement steps of the method for transmitting CSI described above, or execute one or more second computer programs stored in the memory to implement steps of the method for receiving CSI described above.

The present disclosure further provides a storage medium. The storage medium stores one or more first computer programs which are executable by one or more processors to implement the method described above; or the storage medium stores one or more second computer programs which are executable by one or more processors to implement steps of the method for receiving CSI described above.

According to the method and apparatus for transmitting and receiving CSI, a communication node, and a storage medium provided by the embodiments of the present disclosure, a CSI matrix H is decomposed to obtain a vector group, where the vector group includes at least two vector matrices, element information of at least one vector matrix in the vector group is quantized, and the quantized element information is transmitted. In some implementation processes, quantization and feedback can be performed based on element information in the vector group obtained by decomposing the CSI matrix, thereby enriching the quantitation and feedback manners of CSI and providing more implementation manners for CSI quantitation and feedback.

DETAILED DESCRIPTION

In order for the object, solution and advantages of the present disclosure to be more apparent, embodiments of the present disclosure are further described below in detail in conjunction with implementations and drawings. It is to be understood that the embodiments described herein are intended to explain the present disclosure and not to limit the present disclosure.

Embodiment One

Figure 1:
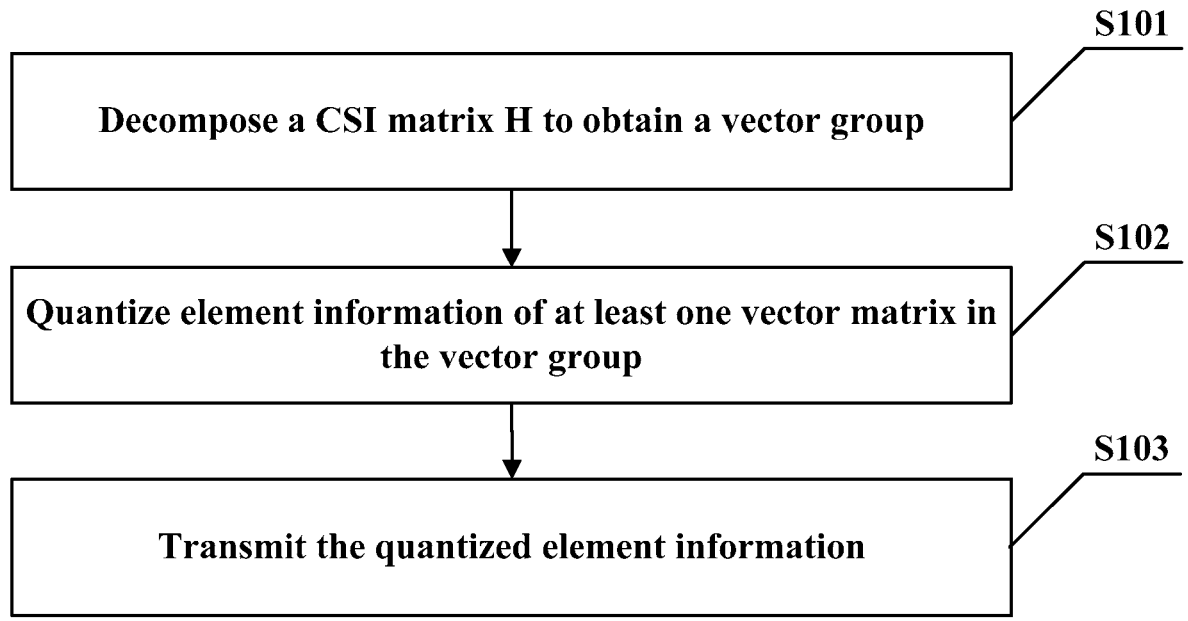
FIG. 1 is a flowchart of a method for transmitting CSI according to Embodiment one of the present disclosure.

This embodiment provides a method for transmitting CSI. With reference to FIG. 1, the method is applied to a first communication node and includes steps S101, S102, and S103.

In S101, a CSI matrix H is decomposed to obtain a vector group.

The vector group obtained in step S101 includes at least two vector matrices. The CSI matrix H may be a precoding matrix recommended by the first communication node, or the CSI matrix H is a weighting coefficient matrix for linearly combining codebook base vectors. In this embodiment, each vector unit of at least one vector matrix in the vector group may be pairwise orthogonal, and the vector unit in this embodiment may be a column in the vector matrix or a row in the vector matrix.

In this embodiment, the dimension of the vector matrix may be determined by at least one of: the number of sub-bands in a feedback bandwidth of the CSI; the number of channel state information reference signal (CSI-RS) ports associated with the CSI; or the number of codebook base vectors.

It is to be understood that the dimension of the vector matrix mentioned in this embodiment may refer to the number of rows of the vector matrix or the number of columns of the vector matrix.

Specifically, when the CSI matrix is a precoding matrix, the dimension of the corresponding decomposed vector matrix may be determined by at least one of the number of sub-bands in the feedback bandwidth of the CSI or the number of CSI-RS ports associated with the CSI. For example, the number of rows of a vector matrix may be equal to the number of CSI-RS ports associated with the CSI, and the number of columns of the vector matrix may be equal to the number of sub-bands in the feedback bandwidth of the CSI.

The first communication node in this embodiment may be a base station or a terminal or may be another network device. Herein, the following examples are described below by using an example in which the first communication node is a terminal.

Figure 2:
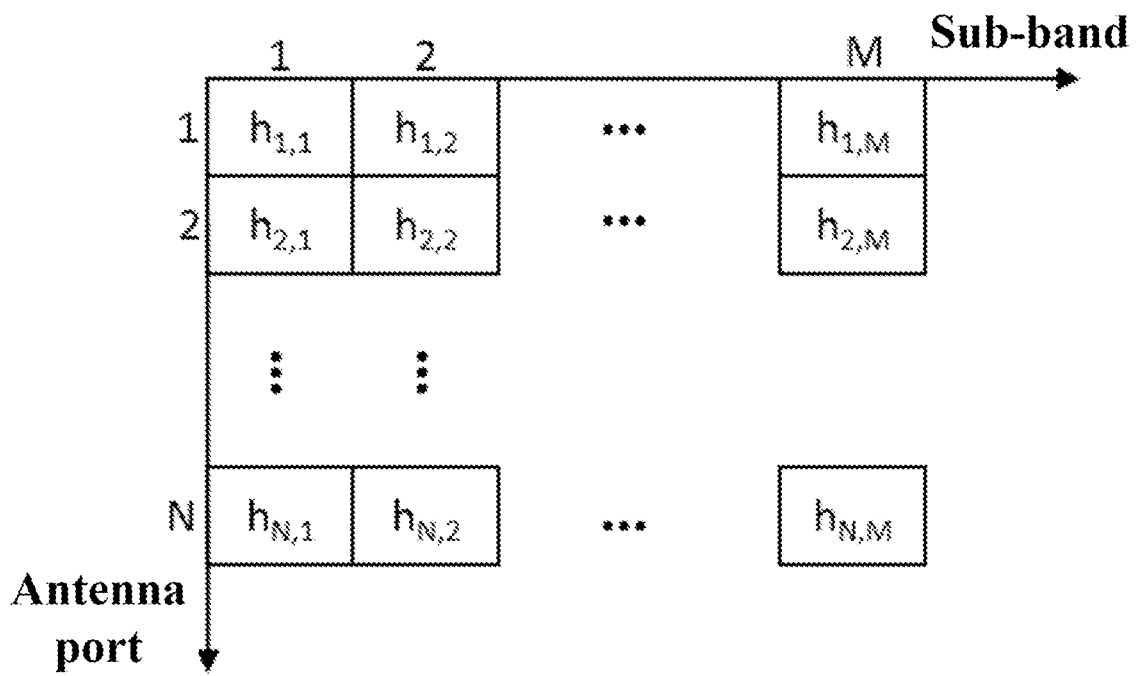
FIG. 2 is a schematic diagram of precoding information of each sub-band according to Embodiment one of the present disclosure.

In a first example, the terminal may obtain, according to a measured reference signal, broadband rank indicator (RI) information of the feedback bandwidth of the CSI, as well as CSI recommended or preferred by the terminal, such as a precoding matrix, on each sub-band of the feedback bandwidth of the CSI. As shown in FIG. 2, in a system where the number of antenna ports is N and the feedback bandwidth of the CSI includes M sub-bands, the broadband RI indicates that there are a total of R layers, and the CSI of each layer is shown in FIG. 2.

Specifically, the CSIs of all sub-bands corresponding to all antenna ports in each layer are formed a matrix H of (N×M), and the element in an $n^{th}$ row and an $m^{th}$ column of the matrix H is $h_{n,m}$. $h_{n,m}$ denotes a CSI coefficient recommended by the terminal on an $n^{th}$ antenna port and an $m^{th}$ sub-band, that is, the matrix H is as follows:

$$H = \begin{bmatrix} h_{1,1} & \cdots & h_{1,M} \\ \vdots & \ddots & \vdots \\ h_{N,1} & \cdots & h_{N,M} \end{bmatrix}.$$

In one example of the CSI described above, an $m^{th}$ column vector on a certain layer of the matrix H is:

$$h_m = \begin{bmatrix} h_{1,m} \\ \vdots \\ h_{N,m} \end{bmatrix}.$$

$$h_m = \begin{bmatrix} h_{1,m} \\ \vdots \\ h_{N,m} \end{bmatrix}$$

denotes a precoding vector recommended or preferred by the terminal in an $m^{th}$ sub-band.

In a second example, when a type 2 codebook is configured for CSI feedback, N1=2L codebook base vectors, N2=M sub-bands, and weighting coefficients on N3=R layers may be obtained through the weighted combination of L codebook base vectors, that is, a corresponding weighting coefficient matrix is obtained.

For N antenna port, weighting coefficients of all sub-bands corresponding to all codebook base vectors in each layer are a matrix H of 2L×M, and the element in an $n^{th}$ row and an $m^{th}$ column of the matrix H is $h_{n,m}$. When n is less than or equal to L, $h_{n,m}$ denotes weighting coefficients of an $n^{th}$ codebook base vector corresponding to the first half of antenna ports (i.e., port 1-port N/2) on a sub-band m. When n is greater than L, $h_{n,m}$ denotes weighting coefficients of the $(n-L)^{th}$ codebook base vector corresponding to the second half of antenna ports (i.e., port N/2+1-port N) on a sub-band m. Therefore, the matrix H is as follows:

$$H = \begin{bmatrix} h_{1,1} & \cdots & h_{1,M} \\ \vdots & \ddots & \vdots \\ h_{2L,1} & \cdots & h_{2L,M} \end{bmatrix}.$$

In a third example, for the weighting coefficients of codebook base vectors of each layer, the terminal selects and reports the strongest codebook base vector, and sets the weighting coefficient of this strongest codebook base vector to 1. On each sub-band, the terminal performs the above-mentioned processing only on the total of (2L−1) weighting coefficients of other codebook base vectors, that is, the matrix H is a matrix of (2L−1) rows and M columns.

Three manners of obtaining the CSI matrix are described above, and the manner of decomposing the CSI matrix will be described below. In this embodiment, after the CSI is decomposed, at least two vector matrices should be obtained.

It should be noted that no matter which of the manners in the above-mentioned examples is used to obtain the CSI matrix H, after this matrix is obtained, the matrix H may be directly decomposed, and this manner of directly decomposing the matrix H is used to decompose the matrix H and obtain the matrix U and the matrix V. However, in some embodiments, each element in the matrix H may be processed and then decomposed after processing. For example, each element in the matrix H is divided by corresponding third element information to obtain a matrix $H_0$ corresponding to the matrix H, and the matrix $H_0$ is decomposed to obtain the vector group. For the manner of decomposing the matrix $H_0$ to obtain the vector group, reference may be made to the above-mentioned manner of directly decomposing the matrix H to obtain the vector group, which will not be repeated herein.

In this embodiment, the third element information may be obtained in at least one of the following manners: the third element information is obtained according to the number of CSI-RS ports associated with the CSI; the third element information is obtained according to the number of sub-bands in the feedback bandwidth of the CSI; the third element information is obtained according to the number of codebook base vectors that are subjected to a weighted combination; or the third element information is obtained according to weighting coefficient broadband information of a codebook base vector.

Specifically, a third amplitude information set may be obtained for different codebook base vectors that are subjected to weighted combination; or a third amplitude set may be obtained for different CSI-RS ports associated with the CSI, or a third amplitude set may be obtained for different sub-bands in the feedback bandwidth of the CSI.

In S102, element information of at least one vector matrix in the vector group is quantized.

In this embodiment, the element information includes, but is not limited to, at least one of amplitude information or phase information. Specifically, element information corresponding to a certain element in at least one vector matrix in the vector group may be quantized. The element information corresponding to a certain element herein may be element information of the element itself or corresponding element information obtained by performing some processing on the element information of the element itself. Of course, in this embodiment, element information of an element corresponding to the vector matrix may also be quantized. The specific details will be described below.

In S103, the quantized element information is transmitted.

Specifically, the quantized element information may be transmitted to a second communication node. For example, when the first communication node is a terminal, the second communication node may be a base station, and the terminal may transmit the quantized element information to the base station.

For the first example described above, it is supposed that CSI matrices $U=[U_1 \ldots U_d]$ and $V=[V_1 \ldots V_d]$ are obtained by decomposing the matrix H, where U is a matrix having N rows and d columns, where all column vectors Uk are pairwise orthogonal, and V is a matrix having M rows and d columns, where all column vectors $V_t$ are pairwise orthogonal.

In one example of the decomposed CSI matrices described above, the modulus of at least one of column vectors in the matrix U and the matrix V is 1.

For example, the terminal decomposes the matrix H to obtain the following matrices U and V, where $H=UV^H$.

The terminal may transmit the RI, and quantizes and transmits element information of elements in the matrix U and the matrix V corresponding to each layer, and specifically, the terminal may transmit this information to the base station. It is worth noting that when the first communication node is set as a base station, the base station may transmit the quantized element information to the terminal. Through the above manner, CSI feedback with high accuracy can be implemented while meeting low feedback overhead. In an embodiment, d is less than M*N/(M+N), and at this point, the feedback overhead can be greatly reduced.

Based on the example described above, in a further example, the terminal may also transmit channel quality indicator (CQI) information of the sub-band. It is supposed that the matrices corresponding to an $r^{th}$ layer and obtained by decomposing the matrix H are $U^r$ and $V^r$, where $r=1, \ldots, R$, and then the precoding matrix of the assumption for CQI calculation for an $m^{th}$ sub-band is:

$[U^1 V^{1H}(:,m) \ldots U^R V^{RH}(:,m)]$, where $U^r V^{rH}(:, m)$ denotes an $m^{th}$ column of the matrix $U^r V^{rH}$.

In the method mentioned herein, when the number of sub-bands included in the feedback bandwidth of the CSI is greater than or equal to $M_0$, where $M_0$ is an integer greater than 0, the benefit of reducing the feedback overhead can be implemented.

For the second example described above, it is supposed that CSI matrices $U=[U_1 \ldots U_d]$ and $V=[V_1 \ldots V_d]$ are obtained by decomposing the matrix H, where U is a matrix having 2L rows and d columns, where all column vectors Uk are pairwise orthogonal, and V is a matrix having M rows and d columns, where all column vectors Vt are pairwise orthogonal.

In one example of the decomposed CSI matrices described above, the modulus of at least one of column vectors in the matrix U and the matrix V is 1.

For example, the terminal decomposes the matrix H to obtain the following matrices U and V, where $H=UV^H$.

The terminal may transmit the RI to indicate a codebook index of a codebook base vector and element information of elements in the matrix U and the matrix V corresponding to each layer.

Based on the example described above, in a further example, the terminal may also transmit CQI information of the sub-band. It is supposed that the matrices corresponding to an $r^{th}$ layer and obtained by decomposing the matrix H are $U^r$ and $V^r$, where $r=1, \ldots, R$, and then the precoding matrix of the assumption for CQI calculation for an $m^{th}$ sub-band is:

$$\begin{bmatrix} W_1 & 0 \\ 0 & W_1 \end{bmatrix} W_2^m = \begin{bmatrix} v_1, \ldots, v_L & 0 \\ 0 & v_1, \ldots, v_L \end{bmatrix} \begin{bmatrix} c_{1,1}(m) & c_{1,R}(m) \\ \vdots & \vdots \\ c_{L,1}(m) & c_{L,R}(m) \\ \ldots \\ c_{L+1,1}(m) & c_{L+1,R}(m) \\ \vdots & \vdots \\ c_{2L,1}(m) & c_{2L,R}(m) \end{bmatrix},$$

where $v_1, \ldots, v_L$ are L codebook base vectors, and $c_{n,r}(m)$ denotes an element in an $n^{th}$ row and an $m^{th}$ column of the matrix $U'V'^H$, where $n=1, \ldots, 2L$. The above expression may also be expressed as $W_1(p, l)=v_l(p)$, $W_2^m(n, r)=c_{n,r}(m)$, $c_{n,r}(m)=G_r(n, m)$, and $G_r=U'V'^H$, where $p=1, \ldots, N/2$, and $l=1, \ldots, L$.

For the third example described above, when the matrix H is decomposed, for the decomposition manner, reference may be made to the decomposition manner in the second example, which will not be repeated herein, and at this point, the CQI information of the sub-band may also be transmitted. It is worth noting that at this point, when the precoding matrix of the CQI is calculated, a matrix formed by combining coefficients 1 and H corresponding to the strongest codebook base vector may be used. In an embodiment, the strongest codebook base vector is a codebook base vector having the strongest broadband information of the weighting coefficient, and the broadband information herein includes at least one of broadband amplitude information and broadband strength information. Furthermore, when elements in the preceding matrix H of (2L−1) rows and M columns are processed as weighting coefficients of the other (2L−1) codebook base vectors, the elements are divided by the value of the weighting coefficient of the strongest codebook base vector.

Step S102 in which the element information of at least one vector matrix in the vector group is quantized may include the following step.

For one vector matrix, a B-bit quantization is performed on second element information corresponding to each element in the vector matrix based on first element information of the vector matrix to obtain the quantized second element information. At this point, the quantized second element information may be transmitted.

In some embodiments, for one vector matrix, the first element information of the vector matrix may also be quantized based on A bits to obtain the quantized first element information, and the quantized first element information is transmitted.

It is to be noted that the specific values of A and B may be randomly set, and in an embodiment, in order to reduce the feedback overhead, in this embodiment, A is greater than B.

As described above, the element information in this embodiment includes, but is not limited to, at least one of amplitude information or phase information. When the element information includes the amplitude information, for one vector matrix, the corresponding first element information and the second element information should include first amplitude information and second amplitude information, respectively. Therefore, at this point, the first element information may indicate at least one of:
  a maximum value of amplitudes of elements in one vector matrix;
  an average value of amplitudes of elements in one vector matrix;
  a maximum value of amplitudes of elements in each vector unit included in one vector matrix;
  an average value of amplitudes of elements in each vector unit included in one vector matrix;
  an amplitude value of a weighting coefficient of the strongest codebook base vector; or
  an amplitude value of a codebook base vector broadband weighting coefficient.

The second element information may indicate at least one of:
  a ratio of an amplitude of each element in one vector matrix to the first amplitude information;
  a difference between an amplitude of each element in one vector matrix and the first amplitude information;
  a ratio of an amplitude of each element in one vector matrix to first amplitude information corresponding to a vector unit in which the element is located; or
  a difference value between an amplitude of each element in one vector matrix and first amplitude information corresponding to a vector unit in which the element is located.

When the element information includes the phase information, for one vector matrix, the corresponding first element information and the second element information should include first phase information and second phase information, respectively. Therefore, at this point, the first element information may indicate at least one of:
  a maximum value of phases of elements in one vector matrix;
  an average value of phases of elements in one vector matrix;
  a maximum value of phases of elements in each vector unit included in one vector matrix;
  an average value of phases of elements in each vector unit included in one vector matrix;
  a phase value of a weighting coefficient of the strongest codebook base vector; or
  a phase value of a codebook base vector broadband weighting coefficient.

The second element information indicates at least one of:
  a ratio of a phase of each element in one vector matrix to the first phase information;
  a difference value between a phase of each element in one vector matrix and the first phase information;
  a ratio of a phase of each element in one vector matrix to first phase information corresponding to a vector unit in which the element is located; or
  a difference value between a phase of each element in one group of vectors and first phase information corresponding to a vector unit in which the element is located.

In some embodiments, the method may further include transmitting S pieces of fourth element information, and at this point, the CSI matrix H is equal to a product of one or more matrices formed by at least one vector unit in the corresponding vector matrix and a matrix formed by the S pieces of fourth element information, where S is an integer greater than or equal to 1.

In some embodiments, at least one candidate value in a candidate value set corresponding to at least one of the first element information, the second element information, the element information of each element, or a product of at least two of the first element information, the second element information or the element information of each element may be determined according to at least one of the following parameters:
  the number N of sub-bands in the feedback bandwidth of the CSI;
  the number $N_T$ of CSI-RS ports associated with the CSI;
  a maximum value d in a set composed of third element information;
  pre-configured configuration information;
  the number L of codebook base vectors that are subjected to the weighted combination; or
  at least one of a ratio or product of at least two of N, L, $N_T$ or d.

In some embodiments, a maximum candidate value in a candidate value set corresponding to at least one of the first element information, the second element information, the element information of each element, or the fourth element information is one of:

1;

$\sqrt[j]{aNd^x}$, where a is a positive integer, and x is an integer greater than or equal to 0;

$$\sqrt{\frac{bN}{N_T}},$$

where b is a positive integer; or $$\sqrt{\frac{cNd}{N_T}},$$

where c is a positive integer,
where N is the number of sub-bands in the feedback bandwidth of the CSI, $N_T$ is the number of CSI-RS ports associated with the CSI, and d is the maximum value in the set composed of third element information.

In some embodiments, at least one candidate value in a candidate value set corresponding to at least one of the first element information, the second element information, the element information of each element, or the fourth element information is one of:

$$p\sqrt{\frac{1}{N_T}},$$

where p is a constant greater than or equal to 0;

$$q\sqrt{\frac{1}{N}},$$

where q is a constant greater than or equal to 0;

$$w\sqrt{\frac{1}{L}} \text{ or } w\sqrt{\frac{1}{L-1}},$$

where w is a constant greater than or equal to 0; or $$z\sqrt{\frac{1}{2L-1}},$$

where z is a constant greater than or equal to 0,
where N is the number of sub-bands in the feedback bandwidth of the CSI, $N_T$ is the number of CSI-RS ports associated with the CSI, and L is the number of codebook base vectors that are subjected to the weighted combination.

In some embodiments, for a certain vector unit having a length of G in the vector group, where G is an integer greater than or equal to 2, the element information includes amplitude information, and the amplitude information includes a quantized value corresponding to at least one of amplitude information of each element in the vector unit, fifth element information corresponding to the vector unit, sixth element information corresponding to each element in the vector unit, or a product of at least two of the amplitude information of each element, the fifth element information or the sixth element information, where the quantized value includes at least one of the following values:

$J \cdot \cos \theta_1$;

$J \cdot \cos \theta_m \Pi_{i=1}^{m-1} \sin \theta_i$, where m is at least one of $\{2, \ldots, G-1\}$; or $J \cdot \sin \theta_{G-1} \Pi_{i=1}^{G-2} \sin \theta_i$, where J is a constant greater than or equal to 0, and a value range of each angle in $\{\theta_1, \ldots, \theta_{G-1}\}$ is $[0, 2\pi]$.

At this point, the step in which the element information of at least one vector matrix in the vector group is quantized includes: quantizing each angle in $\{\theta_1, \ldots, \theta_{G-1}\}$.

In this embodiment, the fifth element information indicates at least one of:
a maximum value of amplitudes of elements in the vector unit; or
an average value of amplitudes of elements in the vector unit.

The sixth element information indicates at least one of:
a ratio of an amplitude of each element in the vector unit to the fifth element information; or
a difference value between an amplitude of each element in the vector unit and the fifth element information.

Furthermore, the step in which the element information of at least one vector matrix in the vector group is quantized further includes the following step.

A C-bit quantization is performed on first angle information of $\{\theta_1, \ldots, \theta_{G-1}\}$, and a D-bit quantization is performed on second angle information corresponding to each angle of $\{\theta_1, \ldots, \theta_{G-1}\}$ based on the first angle information to obtain the quantized second angle information.

In order to reduce the feedback overhead, in an embodiment, C is greater than D.

It is to be noted that the first angle information may indicate at least one of:
a maximum value of angles in $\{\theta_1, \ldots, \theta_{G-1}\}$; or
an average value of angles in $\{\theta_1, \ldots, \theta_{G-1}\}$.

The second angle information may indicate at least one of:
a ratio of each angle in $\{\theta_1, \ldots, \theta_{G-1}\}$ to the first angle information, or a difference value between each angle in $\{\theta_1, \ldots, \theta_{G-1}\}$ and the first angle information.

Through the new method for transmitting CSI provided by the embodiments of the present disclosure, feedback and quantization can be performed based on element information in the vector group obtained by decomposing the CSI matrix, thereby enriching the quantitation and feedback manners of CSI and providing more implementation manners for CSI quantitation and feedback.

Embodiment Two

Figure 3:
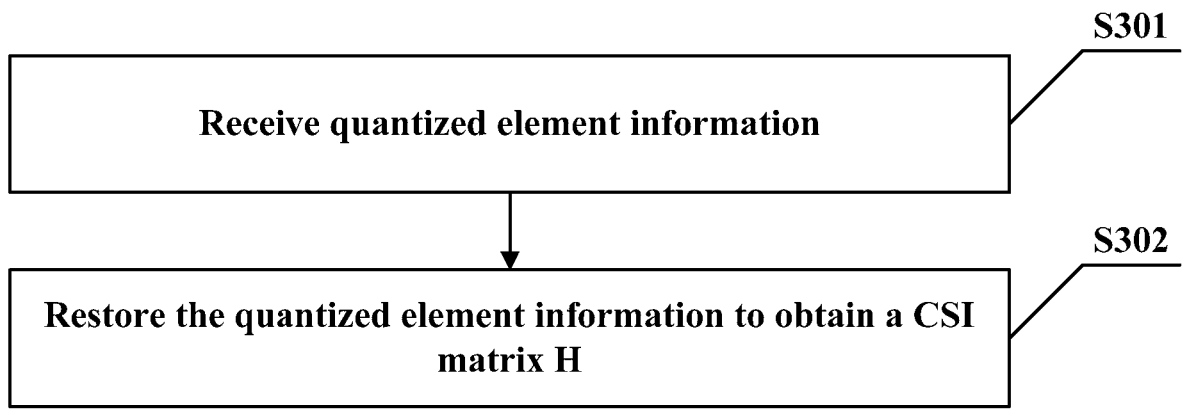
FIG. 3 is a flowchart of a method for receiving CSI according to Embodiment two of the present disclosure.

This embodiment provides a method for receiving CSI. With reference to FIG. 3, the method is applied to a second communication node and includes steps S301 and S302.

In 301, quantized element information is received.
Specifically, the second communication node may receive the quantized element information transmitted by the first communication node.

In this embodiment, the element information is information corresponding to an element in at least one vector matrix in a vector group obtained by decomposing a CSI matrix H, and the vector group obtained by decomposing the matrix H includes at least two vector matrices.

The CSI matrix H may be a precoding matrix recommended by the first communication node, or the CSI matrix H is a weighting coefficient matrix for linearly combining codebook base vectors. In this embodiment, each vector unit of at least one vector matrix in the vector group may be pairwise orthogonal, and the vector unit in this embodiment may be a column in the vector matrix or a row in the vector matrix.

In this embodiment, the dimension of the vector matrix may be determined by at least one of:
the number of sub-bands in the feedback bandwidth of the CSI;
the number of CSI-RS ports associated with the CSI; or
the number of codebook base vectors.

It is to be understood that the dimension of the vector matrix mentioned in this embodiment may refer to the number of rows of the vector matrix or the number of columns of the vector matrix.

Specifically, when the CSI matrix is a precoding matrix, the dimension of the corresponding decomposed vector matrix may be determined by at least one of the number of sub-bands in the feedback bandwidth of the CSI or the number of CSI-RS ports associated with the CSI. For example, the number of rows of one vector matrix may be equal to the number of CSI-RS ports associated with the CSI, and the number of columns of the vector matrix may be equal to the number of sub-bands in the feedback bandwidth of the CSI.

In this embodiment, the second communication node may be a base station or a terminal, and when the second communication node is a base station, correspondingly, the first communication node may be a terminal.

In S302, the quantized element information is restored to obtain the CSI matrix H.

In this embodiment, the element information includes, but is not limited to, at least one of amplitude information or phase information.

In some embodiments, the step in which the quantized element information is received may include the following step.

The quantized second element information is received, where the quantized second element information is obtained by performing a B-bit quantization on second element information corresponding to each element in the vector matrix based on first element information of at least one vector matrix.

Furthermore, in some embodiments, the step in which the quantized element information is received may further include: receiving quantized first element information, where the quantized first element information is obtained by performing an A-bit quantization on the first element information of at least one vector matrix.

It is to be noted that the specific values of A and B may be randomly set, and in an embodiment, in order to reduce the feedback overhead, in this embodiment, A is greater than B.

As described above, the element information in this embodiment includes, but is not limited to, at least one of amplitude information or phase information. When the element information includes the amplitude information, for one vector matrix, the corresponding first element information and the second element information should include first amplitude information and second amplitude information, respectively. Therefore, at this point, the first element information may indicate at least one of:
a maximum value of amplitudes of elements in one vector matrix;
an average value of amplitudes of elements in one vector matrix;
a maximum value of amplitudes of elements in each vector unit included in one vector matrix;
an average value of amplitudes of elements in each vector unit included in one vector matrix;
an amplitude value of a weighting coefficient of the strongest codebook base vector; or
an amplitude value of a codebook base vector broadband weighting coefficient.

The second element information may indicate at least one of:
a ratio of an amplitude of each element in one vector matrix to the first amplitude information;
a difference between an amplitude of each element in one vector matrix and the first amplitude information;
a ratio of an amplitude of each element in one vector matrix to first amplitude information corresponding to a vector unit in which the element is located; or
a difference value between an amplitude of each element in one vector matrix and first amplitude information corresponding to a vector unit in which the element is located.

When the element information includes the phase information, for one vector matrix, the corresponding first element information and the second element information should include first phase information and second phase information, respectively. Therefore, at this point, the first element information may indicate at least one of:
a maximum value of phases of elements in one vector matrix;
an average value of phases of elements in one vector matrix;
a maximum value of phases of elements in each vector unit included in one vector matrix;
an average value of phases of elements in each vector unit included in one vector matrix;
a phase value of a weighting coefficient of the strongest codebook base vector; or
a phase value of a codebook base vector broadband weighting coefficient.

The second element information indicates at least one of:
a ratio of a phase of each element in one vector matrix to the first phase information;
a difference value between a phase of each element in one vector matrix and the first phase information;
a ratio of a phase of each element in one vector matrix to first phase information corresponding to a vector unit in which the element is located; or
a difference value between a phase of each element in one group of vectors and first phase information corresponding to a vector unit in which the element is located.

It is to be noted that the vector group in this embodiment may be obtained by directly decomposing the matrix H by the first communication node, or the vector group in this embodiment may be obtained by decomposing a matrix $H_0$, where the matrix $H_0$ is obtained by dividing each element in the matrix H by corresponding third element information.

In this embodiment, the third element information may be obtained in at least one of the following manners:

the third element information is obtained according to the number of CSI-RS ports associated with the CSI;
the third element information is obtained according to the number of sub-bands in the feedback bandwidth of the CSI;
the third element information is obtained according to the number of codebook base vectors that are subjected to a weighted combination; or
the third element information is obtained according to weighting coefficient broadband information of a codebook base vector.

In some embodiments, the method may further include: receiving S pieces of fourth element information, and at this point, the CSI matrix H is equal to a product of one or more matrices formed by at least one vector unit in the corresponding vector matrix and a matrix formed by the S pieces of fourth element information, where S is an integer greater than or equal to 1.

In some embodiments, at least one candidate value in a candidate value set corresponding to at least one of the first element information, the second element information, the element information of each element, or a product of at least two of the first element information, the second element information or the element information of each element may be determined according to at least one of the following parameters:
the number N of sub-bands in the feedback bandwidth of the CSI;
the number $N_T$ of CSI-RS ports associated with the CSI;
a maximum value d in a set composed of third element information;
pre-configured configuration information;
the number L of codebook base vectors that are subjected to the weighted combination; or
at least one of a ratio or product of at least two of N, L, $N_T$ or d.

It is to be noted that the element information of each element mentioned in this embodiment refers to information of the element itself such as the amplitude of the element or the phase of the element, and the second element information corresponding to a certain element is obtained based on the element information of the element itself.

In some embodiments, a maximum candidate value in a candidate value set corresponding to at least one of the first element information, the second element information, the element information of each element, or the fourth element information is one of:

$$\frac{1}{\sqrt{aNd^x}},$$ where a is a positive integer, and x is an integer greater than or equal to 0;

$$\sqrt{\frac{bN}{N_T}},$$

where b is a positive integer; or $$\sqrt{\frac{cNd}{N_T}},$$

where c is a positive integer,
where N is the number of sub-bands in the feedback bandwidth of the CSI, $N_T$ is the number of CSI-RS ports associated with the CSI, and d is the maximum value in the set composed of third element information.

In some embodiments, at least one candidate value in a candidate value set corresponding to at least one of the first element information, the second element information, the element information of each element, or the fourth element information is one of:

$$p\sqrt{\frac{1}{N_T}},$$

where p is a constant greater than or equal to 0;

$$q\sqrt{\frac{1}{N}},$$

where q is a constant greater than or equal to 0;

$$w\sqrt{\frac{1}{L}} \text{ or } w\sqrt{\frac{1}{L-1}},$$

where w is a constant greater than or equal to 0; or $$z\sqrt{\frac{1}{2L-1}},$$

where z is a constant greater than or equal to 0,
where N is the number of sub-bands in the feedback bandwidth of the CSI, $N_T$ is the number of CSI-RS ports associated with the CSI, and L is the number of codebook base vectors that are subjected to the weighted combination.

In some embodiments, for a certain vector unit having a length of G in the vector group, where G is an integer greater than or equal to 2, the element information includes amplitude information, and the amplitude information includes a quantized value corresponding to at least one of amplitude information of each element in the vector unit, fifth element information corresponding to the vector unit, sixth element information corresponding to each element in the vector unit, or a product of at least two of the amplitude information of each element, the fifth element information or the sixth element information, where the quantized value includes at least one of the following values:

$J \cdot \cos \theta_1$;
$J \cdot \cos \theta_m \prod_{i=1}^{m-1} \sin \theta_i$, where m is at least one of $\{2, \ldots, G-1\}$; or
$J \cdot \sin \theta_{G-1} \prod_{i=1}^{G<2} \sin \theta_i$,
where J is a constant greater than or equal to 0, and a value range of each angle in $\{\theta_1, \ldots, \theta_{G-1}\}$ is $[0, 2\pi]$; at this point, the step in which the quantized element information is received includes: receiving a quantized value of each angle in $\{\theta_1, \ldots, \theta_{G-1}\}$.

In this embodiment, the fifth element information indicates at least one of:
a maximum value of amplitudes of elements in the vector unit; or
an average value of amplitudes of elements in the vector unit.

The sixth element information indicates at least one of:
a ratio of an amplitude of each element in the vector unit to the fifth element information; or
a difference value between an amplitude of each element in the vector unit and the fifth element information.

Furthermore, the step in which the quantized element information is received may further include the following step.

Quantized first angle information and quantized second angle information are received, where the quantized first angle information is obtained by performing a C-bit quantization on first angle information of $\{\theta_1, \ldots, \theta_{G-1}\}$, and the quantized second angle information is obtained by performing a D-bit quantization on second angle information corresponding to each angle in $\{\theta_1, \ldots, \theta_{G-1}\}$. In order to reduce the feedback overhead, in an embodiment, C is greater than D.

It is to be noted that the first angle information may indicate at least one of:
a maximum value of angles in $\{\theta_1, \ldots, \theta_{G-1}\}$; or
an average value of angles in $\{\theta_1, \ldots, \theta_{G-1}\}$.

The second angle information may indicate at least one of:
a ratio of each angle in $\{\theta_1, \ldots, \theta_{G-1}\}$ to the first angle information, or a difference value between each angle in $\{\theta_1, \ldots, \theta_{G-1}\}$ and the first angle information.

Through the new method for receiving CSI provided by the embodiments of the present disclosure, CSI can be received based on quantized element information in the vector group obtained by decomposing the CSI matrix, thereby enriching the manners of receiving CSI and providing more implementation manners for receiving CSI.

Embodiment Three

It is supposed that vector matrices obtained by decomposing the matrix H include a matrix U and a matrix V, and generally, the matrix U includes K N-dimensional vectors $[U_1 \ldots U_K]$, the matrix V includes T M-dimensional vectors $[V_1 \ldots V_T]$. The elements in these vectors are quantized, and the simplest manner is to quantize amplitude information of each element using X bits, and quantize phase information of each element using Y bits. The problem brought about by this manner may be that when the values of N and M are large, the feedback overhead is large.

Therefore, here are some quantization manners that can reduce the feedback overhead.

The first quantization manner is as follows.

For a certain vector matrix in the matrices U and V, first amplitude information is obtained for the entire vector matrix, where the first amplitude information may be a maximum value of all amplitudes of element in the vector or an average value of amplitudes of all elements in the vector, and the first amplitude information is quantized by X bits to obtain the quantized first amplitude information. Based on the first amplitude information, differential coding is performed for all elements in the vector to obtain second amplitude information. Quantization is performed for the second amplitude information, where the second amplitude information may be ratios of amplitudes of all elements in the original vector to the first amplitude information. Each ratio is quantized by X1 bits, and the amplitudes of elements in the matrices U and V are products of the first amplitude information and the second amplitude information. When X1 is less than X, compared with the direct quantization and feedback of the amplitude of the element, the manner of differential quantization and feedback can reduce the feedback overhead.

This manner may also be used in the quantization and feedback of the phase information. Specifically, for a certain vector in the matrices U and V, first phase information is obtained for the entire vector, where the first phase information may be a maximum value of phases of all elements in the vector or an average value of phases of all elements in the vector, and the first phase information is quantized by Y bits to obtain quantized first phase information. Based on the first phase information, differential coding is performed for all elements in the vector to obtain second phase information, where the second phase information may be at least one of ratios of phases of elements in the original vector to the second phase information or difference values between phases of elements in the original vector and the second phase information. Each of second phase information is quantized by Y1 bits, that is, at least one of each ratio or difference value is quantized by Y1 bits. The phases of elements in vectors of the matrices U and V are at least one of the product of the first phase information and the second phase information or the difference value of the first phase information and the second phase information. When Y1 is less than Y, compared with the direct quantization and feedback of amplitudes of elements, the manner of differential quantization and feedback can reduce the feedback overhead.

The second quantization manner is as follows.

Using the good broadband characteristics of the amplitude in frequency, before the matrices U and V are obtained by means of decomposition, the broadband amplitude information may be obtained for at least one of the element amplitude of the recommended precoding matrix or the weighting coefficient amplitude of the weighted combination of codebook base vectors, that is, one piece of broadband amplitude information is obtained for at least one of each layer, each port, or each codebook base vector on all sub-bands, which corresponds to the third element information in the above embodiment, and this broadband amplitude information is quantized by P bits. The CSI before being decomposed is processed, for example, each element is divided by the corresponding broadband amplitude information, the processed CSI is decomposed, and the elements in the matrices U and V obtained after the decomposition are quantized, for example, the amplitude information of these elements is quantized by Q bits. When Q is less than P, the effect of reducing the feedback overhead can be implemented.

In a specific example, the terminal feeds back the recommended precoding matrix on each sub-band. It is supposed that RI is equal to R, for a certain layer $r=1, \ldots, R$, the precoding vector on N ports and M sub-bands is written as a matrix H:

$$H = \begin{bmatrix} h_{1,1} & \cdots & h_{1,M} \\ \vdots & \ddots & \vdots \\ h_{N,1} & \cdots & h_{N,M} \end{bmatrix}.$$

For a fixed port n, the elements on different sub-bands $[h_{n,1} \ldots h_{n,M}]$ get one broadband amplitude which is set to $p_n$, each broadband amplitude information is quantized by P bits, and the precoding coefficients on the port n are divided by $p_n$ to obtain the following matrix:

$$H_0 = \begin{bmatrix} \frac{1}{p_1}h_{1,1} & \cdots & \frac{1}{p_1}h_{1,M} \\ \vdots & \ddots & \vdots \\ \frac{1}{p_N}h_{N,1} & \cdots & \frac{1}{p_N}h_{N,M} \end{bmatrix}.$$

The matrix $H_0$ is directly decomposed to obtain the matrices U and V, and quantization and feedback are performed on the amplitude of each element in the matrices U and V by Q bits.

In another specific example, the terminal feeds back the weighting coefficients for linearly combining codebook base vectors on each sub-band. It is supposed that RI is equal to R, for a certain layer r (r=1, ..., R,) the weighting coefficient of each sub-band corresponding to each codebook base vector is a matrix of 2L×M, the element in the $n^{th}$ row and $m^{th}$ column of the matrix is $h_{n,m}$. When n is less than or equal to L, $h_{n,m}$ denotes weighting coefficients of the $n^{th}$ codebook base vector corresponding to the first half of antenna ports (i.e., port 1-port N/2) on the sub-band m. When n is greater than L, $h_{n,m}$ denotes weighting coefficients of the $(n-L)^{th}$ codebook base vector corresponding to the second half of antenna ports (i.e., port N/2+1-port N) on the sub-band m. Therefore, the matrix H is as follows:

$$H = \begin{bmatrix} h_{1,1} & \cdots & h_{1,M} \\ \vdots & \ddots & \vdots \\ h_{2L,1} & \cdots & h_{2L,M} \end{bmatrix}.$$

For a certain l which is equal to 1, ..., 2L, the coefficients $[h_{l,1} \ldots h_{l,M}]$ on each sub-band get one broadband amplitude $p_l$. Each of broadband amplitude information is quantized by Q bits, and the coefficient on each l is divided by $p_l$ to obtain the following matrix:

$$H_0 = \begin{bmatrix} \frac{1}{p_1}h_{1,1} & \cdots & \frac{1}{p_1}h_{1,M} \\ \vdots & \ddots & \vdots \\ \frac{1}{p_{2L}}h_{2L,1} & \cdots & \frac{1}{p_{2L}}h_{2L,M} \end{bmatrix}.$$

The matrix $H_0$ is directly decomposed to obtain the matrices U and V, and quantization and feedback are performed on the amplitude of each element in the matrices U and V by Q bits.

This quantization manner can also be suitable for quantizing the phase, which will not be repeated herein.

This embodiment provides the specific manner of quantizing the CSI matrix amplitude in the solution described above. When the amplitude of the matrix U or V is quantized, the amplitude range of elements or the amplitude range of part of elements may be obtained according to the parameter configuration of the CSI to determine the maximum value of the amplitude quantization.

Specifically, if the CSI feeds back the precoding matrix recommended by the terminal, then for a CSI whose rank is R, the precoding coefficients on the N ports and M sub-bands in the $r^{th}$ (r=1, ..., R) layer can be written as the following matrix H:

$$H = \begin{bmatrix} h_{1,1} & \cdots & h_{1,M} \\ \vdots & \ddots & \vdots \\ h_{N,1} & \cdots & h_{N,M} \end{bmatrix}.$$

The matrix H may be decomposed to obtain the matrices U and V, for example, $$H=UV^H.$$

Generally, the range of values of the amplitude of the elements in a matrix is greatly related to the dimension of the matrix, and thus the maximum amplitude range of the elements in the matrices U and V is related to at least one of the following parameters:

the number of CSI-RS ports associated with the CSI; or
the number of sub-bands in the feedback bandwidth of the CSI.

Furthermore, the precoding matrix usually meets a condition that a precoding vector power in each layer and on each sub-band is 1, and then for any sub-band m, there is $$h_m = \begin{bmatrix} h_{1,m} \\ \vdots \\ h_{N,m} \end{bmatrix},$$

When $h_m^H h_m = 1$ is met, for $H=[h_1 \ldots h_M]$, there is $$tr(H^H H) = \sum_{m=1}^{M} h_m^H h_m = M.$$

H may be obtained through singular value decomposition (SVD).

$H = U_0 D_0 V_0^H$, where $U_0$ and $V_0$ are orthogonal matrices in which the modulus of each column vector is 1, and $D_0$ is a diagonal or quasi-diagonal matrix, and then there is $$tr(H^H H) = tr(D_0^H D_0) = M.$$

Therefore, the maximum value of elements in $D_0$ does not exceed $\sqrt{M}$.

It can be known that the maximum candidate value of the product of any two elements in the matrices U and V is M. Furthermore, if $U=U_0 D_0$ and $V=V_0$, the maximum candidate value of the amplitude of elements in the matrix U is $\sqrt{M}$, and the maximum candidate value of the amplitude of elements in the matrix V is 1. Similarly, if $U=U_0$ and $V=V_0 D_0$, the maximum candidate value of the amplitude of elements in the matrix U is 1, and the maximum candidate value of the amplitude of elements in the matrix V is $\sqrt{M}$.

In another example, the terminal feeds back the weighting coefficients for linearly combining codebook base vectors on each sub-band. It is supposed that RI is equal to R, for a certain layer r (r=1, ..., R), the weighting coefficient of each sub-band corresponding to each codebook base vector is a matrix of 2L×M, the element in the $n^{th}$ row and $m^{th}$ column of the matrix H is $h_{n,m}$. When n is less than or equal to L, $h_{n,m}$ denotes weighting coefficients of the $n^{th}$ codebook base vector corresponding to the first half of antenna ports (i.e., port 1-port N/2) on the sub-band m. When n is greater than L, $h_{n,m}$ denotes weighting coefficients of the $(n-L)^{th}$ codebook base vector corresponding to the second half of antenna ports (i.e., port N/2+1-port N) on the sub-band m. Therefore, the matrix H is as follows:

$$H = \begin{bmatrix} h_{1,1} & \cdots & h_{1,M} \\ \vdots & \ddots & \vdots \\ h_{2L,1} & \cdots & h_{2L,M} \end{bmatrix}.$$

The matrix H may be decomposed to obtain the matrices U and V, for example, $$H = UV^H.$$

Finally, in this layer, the matrix F formed by the precoding vector on each sub-band may be expressed as $$F = [f_1 \ldots f_M] = WH = WUV^H,$$

where $$W = \begin{bmatrix} v_1, \ldots, v_L & 0 \\ 0 & v_1, \ldots, v_L \end{bmatrix}.$$

$v_1, \ldots, v_L$ are L codebook base vectors. Generally, the codebook base vector is an orthogonal discrete Fourier transformation (DFT) vector or the Kronecker product of DFT vectors, and then when $l_1$ is not equal to $l_2$, $v_{l_1}^H v_{l_2} = 0$ and $v_{l_1}^H v_{l_1} = N/2$.

Generally, the range of values of the amplitude of the elements in a matrix is greatly related to the dimension of the matrix, and thus the maximum amplitude range of the elements in the matrices U and V is related to at least one of the following parameters:

the number of codebook base vectors for the weighted combination; or the number of sub-bands in the feedback bandwidth of the CSI.

Furthermore, if the precoding matrix meets a condition that a precoding vector power in each layer and on each sub-band is 1, for any sub-band m, there is $f_m^H f_m = 1$, and then $tr(F^H F) = M$.

The SVD decomposition is performed in the matrix H to obtain $H = U_0 D_0 V_0^H$, where $U_0$ and $V_0$ are orthogonal matrices in which the modulus of each column vector is 1, and $D_0$ is a diagonal or quasi-diagonal matrix, and then there is $$tr(F^H F) = tr(V_0 D_0^H U_0^H W^H W U_0 D_0 V_0^H) = \frac{N}{2} tr(D_0^H D_0) = M.$$

Therefore, the maximum value of elements in $D_0$ does not exceed $$\sqrt{\frac{2M}{N}}.$$

It can be known that the maximum candidate value of the product of any two elements in the matrices U and V is $$\frac{2M}{N}.$$

Furthermore, if $U = U_0 D_0$ and $V = V_0$, the maximum candidate value of the amplitude of elements in the matrix U is $$\sqrt{\frac{2M}{N}},$$

and the maximum candidate value of the amplitude of elements in the matrix V is 1. Similarly, if $U = U_0$ and $V = V_0 D_0$, the maximum candidate value of the amplitude of elements in the matrix U is 1, and the maximum candidate value of the amplitude of elements in the matrix V is $$\sqrt{\frac{2M}{N}}.$$

In the above examples, if $W = [v_1, \ldots, v_L]$, when $l_1$ is not equal to $l_2$, $v_{l_1}^H v_{l_2} = 0$, and $v_{l_1}^H v_{l_1} = N$.

Therefore, the maximum candidate value of the product of amplitudes of any two elements in the matrices U and V is $$\frac{M}{N}.$$

If $U = U_0 D_0$ and $V = V_0$, the maximum candidate value of the amplitude of elements in the matrix U is $$\sqrt{\frac{M}{N}},$$

and the maximum candidate value of the amplitude of elements in the matrix V is 1. Similarly, if $U = U_0$ and $V = V_0 D_0$, the maximum candidate value of the amplitude of elements in the matrix U is 1, and the maximum candidate value of the amplitude of elements in the matrix V is $$\sqrt{\frac{M}{N}}.$$

If the differential feedback is performed on the amplitude using the second quantization manner described above, the precoding coefficients on all sub-bands in a certain layer are $$H = \begin{bmatrix} h_{1,1} & \cdots & h_{1,M} \\ \vdots & \ddots & \vdots \\ h_{N,1} & \cdots & h_{N,M} \end{bmatrix}.$$

The matrix H is processed using the broadband amplitude to obtain $$H_0 = \begin{bmatrix} \frac{1}{p_1} h_{1,1} & \cdots & \frac{1}{p_1} h_{1,M} \\ \vdots & \ddots & \vdots \\ \frac{1}{p_N} h_{N,1} & \cdots & \frac{1}{p_N} h_{N,M} \end{bmatrix} = \begin{bmatrix} \frac{1}{p_1} & & \\ & \ddots & \\ & & \frac{1}{p_N} \end{bmatrix} \begin{bmatrix} h_{1,1} & \cdots & h_{1,M} \\ \vdots & \ddots & \vdots \\ h_{N,1} & \cdots & h_{N,M} \end{bmatrix}.$$

The above analysis method is applied to this scenario, and when $d = \max p(1), \ldots, pN$, $tr(D_0^H D_0) \leq Md$.

Therefore, the maximum candidate value of the product of amplitudes of any two elements in the matrices U and V is Md.

If $U = U_0 D_0$ and $V = V_0$, the maximum candidate value of the amplitude of elements in the matrix U is $\sqrt{Md}$, and the maximum candidate value of the amplitude of elements in the matrix V is 1. Similarly, if $U=U_0$ and $V=V_0D_0$, the maximum candidate value of the amplitude of elements in the matrix U is 1, and the maximum candidate value of the amplitude of elements in the matrix V is $\sqrt{Md}$.

When the CSI fed back by the terminal is weighting coefficient information for linearly combining codebook base vectors, the weighting coefficients on all sub-bands in a certain layer are $$H = \begin{bmatrix} h_{1,1} & \cdots & h_{1,M} \\ \vdots & \ddots & \vdots \\ h_{N,1} & \cdots & h_{N,M} \end{bmatrix}.$$

The matrix H is processed using the broadband amplitude to obtain $$H_0 = \begin{bmatrix} \frac{1}{p_1}h_{1,1} & \cdots & \frac{1}{p_1}h_{1,M} \\ \vdots & \ddots & \vdots \\ \frac{1}{p_N}h_{N,1} & \cdots & \frac{1}{p_N}h_{N,M} \end{bmatrix} = \begin{bmatrix} \frac{1}{p_1} & & \\ & \ddots & \\ & & \frac{1}{p_N} \end{bmatrix} \begin{bmatrix} h_{1,1} & \cdots & h_{1,M} \\ \vdots & \ddots & \vdots \\ h_{N,1} & \cdots & h_{N,M} \end{bmatrix}.$$

The above analysis method is applied to this scenario, and when $d=\max(p_1, \ldots, p_N)$, $$tr(D_0^H D_0) \leq \sqrt{\frac{2Md}{N}}.$$

Therefore, the maximum candidate value of the product of amplitudes of any two elements in the matrices U and V is $$\frac{2Md}{N}.$$

Furthermore, if $U=U_0D_0$ and $V=V_0$, the maximum candidate value of the amplitude of elements in the matrix U is $$\sqrt{\frac{2Md}{N}},$$

and the maximum candidate value of the amplitude of elements in the matrix V is 1. Similarly, if $U=U_0$ and $V=V_0D_0$, the maximum candidate value of the amplitude of elements in the matrix U is 1, and the maximum candidate value of the amplitude of elements in the matrix V is $$\sqrt{\frac{2Md}{N}}.$$

In the above examples, if $W=[v_1, \ldots, v_L]$, when $l_1$ is not equal to $l_2$, $v_{l_1}^H v_{l_2}=0$, and $v_{l_1}^H v_{l_1}=N$.

Therefore, the maximum candidate value of the product of amplitudes of any two elements in the matrices U and V is $$\frac{Md}{N}.$$

Furthermore, if $U=U_0D_0$ and $V=V_0$, the maximum candidate value of the amplitude of elements in the matrix U is $$\sqrt{\frac{Md}{N}},$$

and the maximum candidate value of the amplitude of elements in the matrix V is 1. Similarly, if $U=U_0$ and $V=V_0D_0$, the maximum candidate value of the amplitude of elements in the matrix U is 1, and the maximum candidate value of the amplitude of elements in the matrix V is $$\sqrt{\frac{Md}{N}}.$$

When the CSI fed back by the terminal is weighting coefficient information for linearly combining codebook base vectors, in another scenario, when $f_m^H f_m=N$, $tr(F^H F)=MN$. When the above analysis method is applied to the scenario, the maximum candidate value of the product of amplitudes of any two elements in the matrices U and V is 2M.

Furthermore, if $U=U_0D_0$ and $V=V_0$, the maximum candidate value of the amplitude of elements in the matrix U is $\sqrt{2M}$, and the maximum candidate value of the amplitude of elements in the matrix V is 1. Similarly, if $U=U_0$ and $V=V_0D_0$, the maximum candidate value of the amplitude of elements in the matrix U is 1, and the maximum candidate value of the amplitude of elements in the matrix V is $\sqrt{2M}$.

Similarly, if differential feedback is performed on the amplitude in this scenario, the above maximum value needs to be divided by d or $\sqrt{d}$.

In addition, it is to be added that if the differential feedback is performed on the amplitude in all possible examples and scenarios in this embodiment using the first quantization manner, all possible maximum values may denote the maximum value of the product of a certain first amplitude and a certain second amplitude.

In all above manners, another quantization and feedback manner is that the terminal decomposes CSI to obtain matrices $U_0$, $V_0$, and $D_0$, when $U=U_0$ and $V=V_0$, the terminal performs quantization and feedback on element information (for example, the amplitude information and phase information of the element) in the matrices $U_0$ and $V_0$, quantizes non-zero elements in the matrix $D_0$ obtained by means of SVD, and additionally feeds back quantization amplitude information of the non-zero elements, where the maximum candidate value of the quantization amplitude is at least one of the above maximum candidate values.

In the above method, one further optimization manner is that the amplitude quantization value set of at least one of the matrices U, D, and V does not include 0.

The third quantization manner is as follows.

In the above examples, at least one of the average value of the amplitudes of the elements of the vectors in the matrices U or V may be $$\sqrt{\frac{1}{N}}, \sqrt{\frac{1}{M}}, \sqrt{\frac{1}{L}}, \text{ or } \sqrt{\frac{1}{2L-1}},$$

and correspondingly, the candidate value set for quantizing these elements includes $$p\sqrt{\frac{1}{N}}, q\sqrt{\frac{1}{M}}, w\sqrt{\frac{1}{L}}, \text{ or } z\sqrt{\frac{1}{2L-1}},$$

respectively, where p, q, w, and z are constant real numbers greater than or equal to zero. In an example, the quantization value set of the amplitudes of the elements in the vectors in the matrices U and V is $$\left\{ 0, \frac{1}{2}\sqrt{\frac{1}{2L-1}}, \sqrt{\frac{1}{2L-1}}, 1 \right\}$$

and $$\left\{ 0, \frac{1}{2}\sqrt{\frac{1}{M}}, \sqrt{\frac{1}{M}}, 1 \right\},$$

respectively. In another example, the quantization value set of the amplitudes of the elements in the vectors in the matrices U and V is $$\left\{ 0, (1-3/5)\sqrt{\frac{1}{2L-1}}, \sqrt{\frac{1}{2L-1}}, (1+3/5)\sqrt{\frac{1}{2L-1}} \right\} \text{ and}$$

$$\left\{ 0, (1-3/8)\sqrt{\frac{1}{M}}, \sqrt{\frac{1}{M}}, (1+3/8)\sqrt{\frac{1}{M}} \right\},$$

respectively.

The fourth quantization manner is as follows.

In the above examples, when at least one of the amplitudes of the elements in the vectors in the matrices U or V are quantized in each sub-solution, since the vectors in at least one of the matrices U or V are obtained by means of SVD decomposition, the modulus of each vector is 1 or a constant J.

For a certain vector having a length of G≥2 in at least one of the matrices U or V, the vector formed by the amplitude of each element of this certain vector may be quantized through the following vector e:

$$e = \begin{bmatrix} \cos\theta_1 \\ \cos\theta_2 \sin\theta_1 \\ \cos\theta_3 \sin\theta_1 \sin\theta_2 \\ \vdots \\ \cos\theta_{G-1} \sin\theta_1 \cdots \sin\theta_{G-2} \\ \sin\theta_{G-1} \sin\theta_1 \cdots \sin\theta_{G-2} \end{bmatrix},$$

where the value range of $\{\theta_1, \ldots, \theta_{G-1}\}$ is 0 to $2\pi$. Specifically, when G is equal to 2, the elements in vector e is $\cos\theta_1$ and $\sin\theta_1$. When G is greater than or equal to 3, $e_1 = \cos\theta_1$, $e_m = \cos\theta_m \Pi_{i=1}^{M-1} \sin\theta_i$, where $m = 2, \ldots, G-1$, and $e_{G-1} = \sin\theta_{G-1} \Pi_{i=1}^{G-2} \sin\theta_i$. For each element in $\{\theta_1, \ldots, \theta_{G-1}\}$, the terminal quantizes and feeds back values of these elements using I bits, respectively, that is, the value set of each element $\theta_i$ is $\{\phi_1, \ldots, \phi_{2^I}\}$, where $\phi_n$ is a constant in $[0, 2\pi]$.

It is to be noted that in the above quantization manners, the sequence of elements in the vector e and $\{\theta_1, \ldots, \theta_{G-1}\}$ may be randomly changed. In addition, if the modulus of the vector e is J, each element in the vector e is multiplied by $\sqrt{J}$.

In an optimization example, the terminal quantizes and feeds back first angle information of H bits for $\{\theta_1, \ldots, \theta_{G-1}\}$ and quantizes and feeds back ratios of each element in $\{\theta_1, \ldots, \theta_{G-1}\}$ to the first angle information or deference values between each element in $\{\theta_1, \ldots, \theta_{G-1}\}$ and the first angle information, where each ratio or deference value is K bits. Optimally, K is less than H. In addition, the first amplitude is the maximum value or average value of $\{\theta_1, \ldots, \theta_{G-1}\}$.

Embodiment Four

Figure 4:
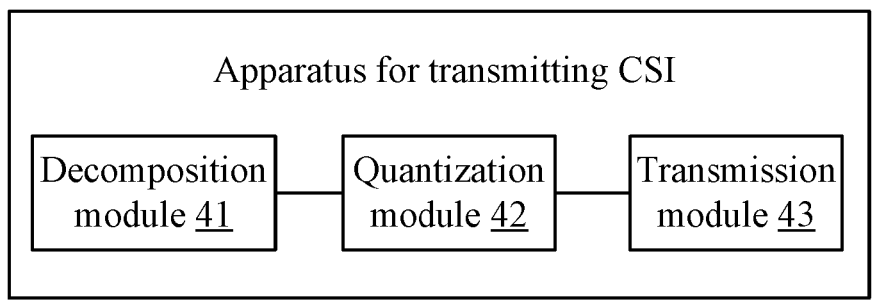
FIG. 4 is a structural diagram of an apparatus for transmitting CSI according to Embodiment four of the present disclosure.

This embodiment provides an apparatus for transmitting CSI. With reference to FIG. 4, the apparatus includes a decomposition module 41, a quantization module 42, and a transmission module 43. The decomposition module 41 is configured to decompose a CSI matrix H to obtain a vector group, where the vector group includes at least two vector matrices. The quantization module 42 is configured to quantize element information of at least one vector matrix in the vector group. The transmission module 43 is configured to transmit the quantized element information.

In this embodiment, the CSI matrix H may be a precoding matrix recommended by the first communication node, or the CSI matrix H is a weighting coefficient matrix for linearly combining codebook base vectors. In this embodiment, each vector unit of at least one vector matrix in the vector group may be pairwise orthogonal, and the vector unit in this embodiment may be a column in the vector matrix or a row in the vector matrix.

In this embodiment, the dimension of the vector matrix may be determined by at least one of:
the number of sub-bands in the feedback bandwidth of the CSI;
the number of CSI-RS ports associated with the CSI; or
the number of codebook base vectors.

It is to be understood that the dimension of the vector matrix mentioned in this embodiment may refer to the number of rows of the vector matrix or the number of columns of the vector matrix.

Specifically, when the CSI matrix is a precoding matrix, the dimension of the corresponding decomposed vector matrix may be determined by at least one of the number of sub-bands in the feedback bandwidth of the CSI or the number of CSI-RS ports associated with the CSI. For example, the number of rows of one vector matrix may be equal to the number of CSI-RS ports associated with the CSI, and the number of columns of the vector matrix may be equal to the number of sub-bands in the feedback bandwidth of the CSI.

It is to be noted that the decomposition module 41 may directly decompose the matrix H or may decompose the matrix H after processing each element in the matrix H. For example, each element in the matrix H is divided by corresponding third element information, respectively, to obtain a matrix $H_0$ corresponding to the matrix H, and the matrix $H_0$ is decomposed to obtain the vector group.

In this embodiment, the third element information may be obtained in at least one of the following manners:
the third element information is obtained according to the number of CSI-RS ports associated with the CSI;
the third element information is obtained according to the number of sub-bands in the feedback bandwidth of the CSI;
the third element information is obtained according to a number of codebook base vectors that are subjected to a weighted combination; or
the third element information is obtained according to weighting coefficient broadband information of a codebook base vector.

Specifically, a third amplitude information set may be obtained for different codebook base vectors that are subjected to weighted combination; or a third amplitude set may be obtained for different CSI-RS ports associated with the CSI, or a third amplitude set may be obtained for different sub-bands in the feedback bandwidth of the CSI.

In this embodiment, the element information includes, but is not limited to, at least one of amplitude information or phase information. Specifically, the quantization module 42 may quantize element information corresponding to a certain element in at least one vector matrix in the vector group. The element information corresponding to a certain element herein may be element information of the element itself, or corresponding element information obtained by performing some processing on the element information of the element itself. Of course, in this embodiment, element information of an element corresponding to the vector matrix may also be quantized. The specific details will be described below.

The apparatus for transmitting CSI in this embodiment may be applied to the first communication node, and at this point, the transmission module 43 is configured to transmit the quantized element information to the second communication node.

For one vector matrix, the quantization module in this embodiment may perform a B-bit quantization on second element information corresponding to each element in the vector matrix based on first element information of the vector matrix to obtain the quantized second element information. At this point, the transmission module 43 may transmit the quantized second element information.

In some embodiments, for one vector matrix, the quantization module 42 may also quantize the first element information of the vector matrix based on A bits to obtain the quantized first element information, and the transmission module 43 transmits the quantized first element information.

It is to be noted that the specific values of A and B may be randomly set, and in an embodiment, in order to reduce the feedback overhead, in this embodiment, A is greater than B.

As described above, the element information in this embodiment includes, but is not limited to, at least one of amplitude information or phase information. When the element information includes the amplitude information, for one vector matrix, the corresponding first element information and the second element information should include first amplitude information and second amplitude information, respectively. Therefore, at this point, the first element information may indicate at least one of:
a maximum value of amplitudes of elements in one vector matrix;
an average value of amplitudes of elements in one vector matrix;
a maximum value of amplitudes of elements in each vector unit included in one vector matrix;
an average value of amplitudes of elements in each vector unit included in one vector matrix;
an amplitude value of a weighting coefficient of the strongest codebook base vector; or
an amplitude value of a codebook base vector broadband weighting coefficient.

The second element information may indicate at least one of:
a ratio of an amplitude of each element in one vector matrix to the first amplitude information;
a difference between an amplitude of each element in one vector matrix and the first amplitude information;
a ratio of an amplitude of each element in one vector matrix to first amplitude information corresponding to a vector unit in which the element is located; or
a difference value between an amplitude of each element in one vector matrix and first amplitude information corresponding to a vector unit in which the element is located.

When the element information includes the phase information, for one vector matrix, the corresponding first element information and the second element information should include first phase information and second phase information, respectively. Therefore, at this point, the first element information may indicate at least one of:
a maximum value of phases of elements in one vector matrix;
an average value of phases of elements in one vector matrix;
a maximum value of phases of elements in each vector unit included in one vector matrix;
an average value of phases of elements in each vector unit included in one vector matrix;
a phase value of a weighting coefficient of the strongest codebook base vector; or
a phase value of a codebook base vector broadband weighting coefficient.

The second element information indicates at least one of:
a ratio of a phase of each element in one vector matrix to the first phase information;
a difference value between a phase of each element in one vector matrix and the first phase information;
a ratio of a phase of each element in one vector matrix to first phase information corresponding to a vector unit in which the element is located; or
a difference value between a phase of each element in one group of vectors and first phase information corresponding to a vector unit in which the element is located.

In some embodiments, the transmission module 43 may also transmit S pieces of fourth element information, and at this point, the CSI matrix H is equal to a product of one or more matrices formed by at least one vector unit in the corresponding vector matrix and a matrix formed by the S pieces of fourth element information, where S is an integer greater than or equal to 1.

In some embodiments, at least one candidate value in a candidate value set corresponding to at least one of the first element information, the second element information, the element information of each element, or a product of at least two of the first element information, the second element information or the element information of each element may be determined according to at least one of the following parameters:

the number N of sub-bands in the feedback bandwidth of the CSI;
the number $N_T$ of CSI-RS ports associated with the CSI;
a maximum value d in a set composed of third element information;
pre-configured configuration information;
the number L of codebook base vectors that are subjected to the weighted combination; or
at least one of a ratio or product of at least two of N, L, $N_T$ or d.

In some embodiments, a maximum candidate value in a candidate value set corresponding to at least one of the first element information, the second element information, the element information of each element, or the fourth element information is one of:

1;

$\sqrt{aNd^x}$, where a is a positive integer, and x is an integer greater than or equal to 0;

$$\sqrt{\frac{bN}{N_T}},$$

where b is a positive integer; or $$\sqrt{\frac{cNd}{N_T}},$$

where c is a positive integer,
where N is the number of sub-bands in the feedback bandwidth of the CSI, $N_T$ is the number of CSI-RS ports associated with the CSI, and d is the maximum value in the set composed of third element information.

In some embodiments, at least one candidate value in a candidate value set corresponding to at least one of the first element information, the second element information, the element information of each element, or the fourth element information is one of:

$$p\sqrt{\frac{1}{N_T}},$$

where p is a constant greater than or equal to 0;

$$q\sqrt{\frac{1}{N}},$$

where q is a constant greater than or equal to 0;

$$w\sqrt{\frac{1}{L}} \text{ or } w\sqrt{\frac{1}{L-1}},$$

where w is a constant greater than or equal to 0; or $$z\sqrt{\frac{1}{2L-1}},$$

where z is a constant greater than or equal to 0,
where N is the number of sub-bands in the feedback bandwidth of the CSI, $N_T$ is the number of CSI-RS ports associated with the CSI, and L is the number of codebook base vectors that are subjected to the weighted combination.

In some embodiments, for a certain vector unit having a length of G in the vector group, where G is an integer greater than or equal to 2, the element information includes amplitude information, and the amplitude information includes a quantized value corresponding to at least one of amplitude information of each element in the vector unit, fifth element information corresponding to the vector unit, sixth element information corresponding to each element in the vector unit, or a product of at least two of the amplitude information of each element, the fifth element information or the sixth element information, where the quantized value includes at least one of the following values:

$J \cdot \cos \theta_1$;
$J \cdot \cos \theta_m \Pi_{i=1}^{m-1} \sin \theta_i$, where m is at least one of $\{2, \ldots, G-1\}$; or
$J \cdot \sin \theta_{G-1} \Pi_{i=1}^{G-2} \sin \theta_i$,
where J is a constant greater than or equal to 0, and a value range of each angle in $\{\theta_1, \ldots, \theta_{G-1}\}$ is $[0, 2\pi]$.

At this point, the quantization module 42 may quantize each angle in $\{\theta_1, \ldots, \theta_{G-1}\}$.

In this embodiment, the fifth element information indicates at least one of:
a maximum value of amplitudes of elements in the vector unit; or
an average value of amplitudes of elements in the vector unit.

The sixth element information indicates at least one of:
a ratio of an amplitude of each element in the vector unit to the fifth element information; or
a difference value between an amplitude of each element in the vector unit and the fifth element information.

Furthermore, the quantization module 42 may also perform C-bit quantization on first angle information of $\{\theta_1, \ldots, \theta_{G-1}\}$ and perform a D-bit quantization on second angle information corresponding to each angle of $\{\theta_1, \ldots, \theta_{G-1}\}$ based on the first angle information to obtain the quantized second angle information.

In order to reduce the feedback overhead, in an embodiment, C is greater than D.

It is to be noted that the first angle information may indicate at least one of:
a maximum value of angles in $\{\theta_1, \ldots, \theta_{G-1}\}$; or
an average value of angles in $\{\theta_1, \ldots \theta_{G-1}\}$.

The second angle information may indicate at least one of:
a ratio of each angle in $\{\theta_1, \ldots, \theta_{G-1}\}$ to the first angle information, or a difference value between each angle in $\{\theta_1, \ldots, \theta_{G-1}\}$ and the first angle information.

Finally, it is to be noted that the functions of the decomposition module 41, the quantization module 42 and the transmission module 43 in this embodiment can be implemented by a processor executing a code stored in a memory.

Through the apparatus for transmitting CSI provided by the embodiments of the present disclosure, feedback and quantization can be performed based on element information in the vector group obtained by decomposing the CSI matrix, thereby enriching the quantitation and feedback manners of CSI and providing more implementation manners for CSI quantitation and feedback.

Embodiment Five

Figure 5:
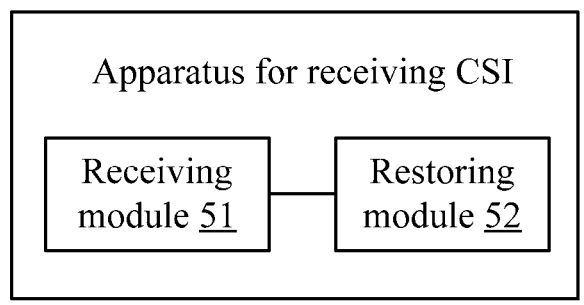
FIG. 5 is a structural diagram of a method for receiving CSI according to Embodiment five of the present disclosure.

This embodiment provides an apparatus for receiving CSI. With reference to FIG. 5, the apparatus includes a receiving module 51 and a restoring module 52. The receiving module 51 is configured to receive quantized element information, where the element information in this embodiment is information corresponding to an element in at least one vector matrix in a vector group obtained by decomposing a CSI matrix H, and the vector group obtained by decomposing the matrix H includes at least two vector matrices. The restoring module 52 is configured to restore the quantized element information to obtain the CSI matrix H.

The apparatus for receiving CSI in this embodiment may be applied to the second communication node, and specifically, the second communication node may receive the quantized element information transmitted by the first communication node through the receiving module 51. The apparatus is applied to the second communication node.

In this embodiment, the CSI matrix H may be a precoding matrix recommended by the first communication node, or the CSI matrix H is a weighting coefficient matrix for linearly combining codebook base vectors. In this embodiment, each vector unit of at least one vector matrix in the vector group may be pairwise orthogonal, and the vector unit in this embodiment may be a column in the vector matrix or a row in the vector matrix.

In this embodiment, the dimension of the vector matrix may be determined by at least one of:
the number of sub-bands in the feedback bandwidth of the CSI;
the number of CSI-RS ports associated with the CSI; or
the number of codebook base vectors.

It is to be understood that the dimension of the vector matrix mentioned in this embodiment may refer to the number of rows of the vector matrix or the number of columns of the vector matrix.

Specifically, when the CSI matrix is a precoding matrix, the dimension of the corresponding decomposed vector matrix may be determined by at least one of the number of sub-bands in the feedback bandwidth of the CSI or the number of CSI-RS ports associated with the CSI. For example, the number of rows of one vector matrix may be equal to the number of CSI-RS ports associated with the CSI, and the number of columns of the vector matrix may be equal to the number of sub-bands in the feedback bandwidth of the CSI.

In this embodiment, the element information includes, but is not limited to, at least one of amplitude information or phase information.

In some embodiments, the receiving module 51 is configured to receive the quantized second element information, where the quantized second element information is obtained by performing a B-bit quantization on second element information corresponding to each element in the vector matrix based on first element information of the at least one vector matrix.

Furthermore, in some embodiments, the receiving module 51 may also receive quantized first element information, where the quantized first element information is obtained by performing an A-bit quantization on the first element information of at least one vector matrix.

It is to be noted that the specific values of A and B may be randomly set, and in an embodiment, in order to reduce the feedback overhead, in this embodiment, A is greater than B.

As described above, the element information in this embodiment includes, but is not limited to, at least one of amplitude information or phase information. When the element information includes the amplitude information, for one vector matrix, the corresponding first element information and the second element information should include first amplitude information and second amplitude information, respectively. Therefore, at this point, the first element information may indicate at least one of:
a maximum value of amplitudes of elements in one vector matrix;
an average value of amplitudes of elements in one vector matrix;
a maximum value of amplitudes of elements in each vector unit included in one vector matrix;
an average value of amplitudes of elements in each vector unit included in one vector matrix;
an amplitude value of a weighting coefficient of the strongest codebook base vector; or
an amplitude value of a codebook base vector broadband weighting coefficient.

The second element information may indicate at least one of:
a ratio of an amplitude of each element in one vector matrix to the first amplitude information;
a difference between an amplitude of each element in one vector matrix and the first amplitude information;
a ratio of an amplitude of each element in one vector matrix to first amplitude information corresponding to a vector unit in which the element is located; or
a difference value between an amplitude of each element in one vector matrix and first amplitude information corresponding to a vector unit in which the element is located.

When the element information includes the phase information, for one vector matrix, the corresponding first element information and the second element information should include first phase information and second phase information, respectively. Therefore, at this point, the first element information may indicate at least one of:
a maximum value of phases of elements in one vector matrix;
an average value of phases of elements in one vector matrix;
a maximum value of phases of elements in each vector unit included in one vector matrix;
an average value of phases of elements in each vector unit included in one vector matrix;
a phase value of a weighting coefficient of the strongest codebook base vector; or
a phase value of a codebook base vector broadband weighting coefficient.

The second element information indicates at least one of:
a ratio of a phase of each element in one vector matrix to the first phase information;

a difference value between a phase of each element in one vector matrix and the first phase information;

a ratio of a phase of each element in one vector matrix to first phase information corresponding to a vector unit in which the element is located; or a difference value between a phase of each element in one group of vectors and first phase information corresponding to a vector unit in which the element is located.

It is to be noted that the vector group in this embodiment may be obtained by directly decomposing the matrix H by the first communication node, or the vector group in this embodiment may be obtained by decomposing a matrix $H_0$, where the matrix $H_0$ is obtained by dividing each element in the matrix H by corresponding third element information.

In this embodiment, the third element information may be obtained in at least one of the following manners:

the third element information is obtained according to the number of CSI-RS ports associated with the CSI;

the third element information is obtained according to the number of sub-bands in the feedback bandwidth of the CSI;

the third element information is obtained according to the number of codebook base vectors that are subjected to a weighted combination; or the third element information is obtained according to weighting coefficient broadband information of a codebook base vector.

In some embodiments, the receiving module 52 may also receive S pieces of fourth element information, and at this point, the CSI matrix H is equal to a product of one or more matrices formed by at least one vector unit in the corresponding vector matrix and a matrix formed by the S pieces of fourth element information, where S is an integer greater than or equal to 1.

In some embodiments, at least one candidate value in a candidate value set corresponding to at least one of the first element information, the second element information, the element information of each element, or a product of at least two of the first element information, the second element information or the element information of each element may be determined according to at least one of the following parameters:

the number N of sub-bands in the feedback bandwidth of the CSI;

the number $N_T$ of CSI-RS ports associated with the CSI;

a maximum value d in a set composed of third element information;

pre-configured configuration information;

the number L of codebook base vectors that are subjected to the weighted combination; or at least one of a ratio or product of at least two of N, L, $N_T$ or d.

It is to be noted that the element information of each element mentioned in this embodiment refers to information of the element itself such as the amplitude of the element or the phase of the element, and the second element information corresponding to a certain element is obtained based on the element information of the element itself.

In some embodiments, a maximum candidate value in a candidate value set corresponding to at least one of the first element information, the second element information, the element information of each element, or the fourth element information is one of:

$$\sqrt{\frac{1}{aNd^x}},$$

where a is a positive integer, and x is an integer greater than or equal to 0;

$$\sqrt{\frac{bN}{N_T}},$$

where b is a positive integer; or $$\sqrt{\frac{cNd}{N_T}},$$

where c is a positive integer, where N is the number of sub-bands in the feedback bandwidth of the CSI, $N_T$ is the number of CSI-RS ports associated with the CSI, and d is the maximum value in the set composed of third element information.

In some embodiments, at least one candidate value in a candidate value set corresponding to at least one of the first element information, the second element information, the element information of each element, or the fourth element information is one of:

$$p\sqrt{\frac{1}{N_T}},$$

where p is a constant greater than or equal to 0;

$$q\sqrt{\frac{1}{N}},$$

where q is a constant greater than or equal to 0;

$$w\sqrt{\frac{1}{L}} \text{ or } w\sqrt{\frac{1}{L-1}},$$

where w is a constant greater than or equal to 0; or $$z\sqrt{\frac{1}{2L-1}},$$

where z is a constant greater than or equal to 0, where N is the number of sub-bands in the feedback bandwidth of the CSI, $N_T$ is the number of CSI-RS ports associated with the CSI, and L is the number of codebook base vectors that are subjected to the weighted combination.

In some embodiments, for a certain vector unit having a length of G in the vector group, where G is an integer greater than or equal to 2, the element information includes amplitude information, and the amplitude information includes a quantized value corresponding to at least one of amplitude information of each element in the vector unit, fifth element information corresponding to the vector unit, sixth element information corresponding to each element in the vector unit, or a product of at least two of the amplitude information of each element, the fifth element information or the sixth element information, where the quantized value includes at least one of the following values:

$J \cdot \cos \theta_1$;

$J \cdot \cos \theta_m \Pi_{i=1}^{m-1} \sin \theta_i$, where m is at least one of $\{2, \ldots, G-1\}$; or $J \cdot \sin \theta_{G-1} \Pi_{i=1}^{G-2} \sin \theta_i$, where J is a constant greater than or equal to 0, and a value range of each angle in $\{\theta_1, \ldots, \theta_{G-1}\}$ is $[0, 2\pi]$. At this point, the receiving module 51 may receive a quantized value of each angle in $\{\theta_1, \ldots, \theta_{G-1}\}$.

In this embodiment, the fifth element information indicates at least one of:

a maximum value of amplitudes of elements in the vector unit; or an average value of amplitudes of elements in the vector unit.

The sixth element information indicates at least one of:

a ratio of an amplitude of each element in the vector unit to the fifth element information; or a difference value between an amplitude of each element in the vector unit and the fifth element information.

Furthermore, the receiving module 51 may also receive quantized first angle information and quantized second angle information, where the quantized first angle information is obtained by performing a C-bit quantization on first angle information of $\{\theta_1, \ldots, \theta_{G-1}\}$, and the quantized second angle information is obtained by performing a D-bit quantization on second angle information corresponding to each angle in $\{\theta_1, \ldots, \theta_{G-1}\}$. In order to reduce the feedback overhead, in an embodiment, C is greater than D.

It is to be noted that the first angle information may indicate at least one of:

a maximum value of angles in $\{\theta_1, \ldots, \theta_{G-1}\}$; or an average value of angles in $\{\theta_1, \ldots, \theta_{G-1}\}$.

The second angle information may indicate at least one of:

a ratio of each angle in $\{\theta_1, \ldots, \theta_{G-1}\}$ to the first angle information, or a difference value between each angle in $\{\theta_1, \ldots, \theta_{G-1}\}$ and the first angle information.

Through the apparatus for receiving CSI provided by the embodiments of the present disclosure, CSI can be received based on quantized element information in the vector group obtained by decomposing the CSI matrix, thereby enriching the manners of receiving CSI and providing more implementation manners for receiving CSI.

Embodiment Six

Figure 6:
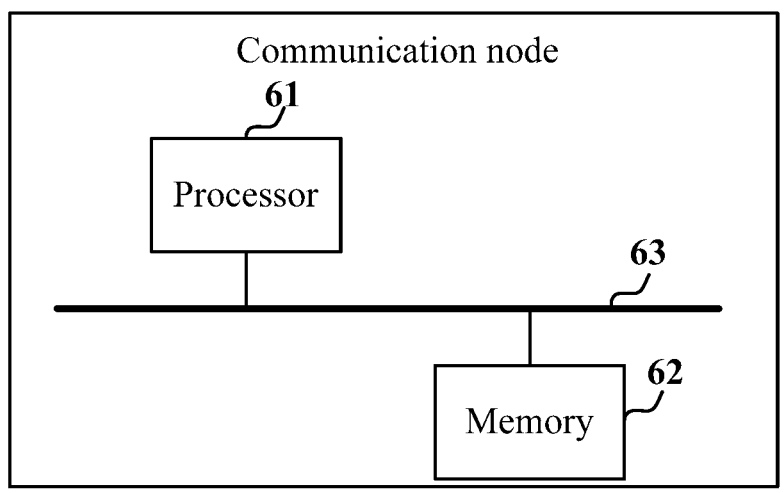
FIG. 6 is a structural diagram of a communication node according to Embodiment six of the present disclosure.

The embodiment provides a communication node. With reference to FIG. 6, the communication node includes a processor 61, a memory 62, and a communication bus 63. The communication bus 63 is configured to implement a connection communication between the processor 61 and the memory 62. The processor 61 is configured to execute one or more first computer programs stored in the memory 62 to implement the steps of the method for transmitting CSI described in Embodiment one, or execute one or more second computer programs stored in the memory 62 to implement the steps of the method for receiving CSI described in Embodiment two.

Specifically, the communication node provided by this embodiment may be one of the first communication node or the second communication node mentioned in above embodiments.

Figure 7:
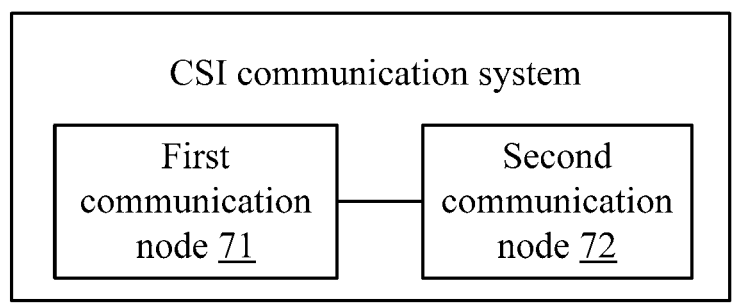
FIG. 7 is a structural diagram of a CSI communication system according to Embodiment even of the present disclosure.

This embodiment provides a CSI communication system. With reference to FIG. 7, the CSI communication system includes a first communication node 71 and a second communication node 72. The first communication node 71 is configured to decompose a CSI matrix H to obtain a vector group, where the vector group includes at least two vector matrices, quantize element information of at least one vector matrix in the vector group, and transmit the quantized element information to the second communication node 72. The second communication node 72 is configured to receive quantized element information and store the element information to obtain the CSI matrix H.

In an embodiment, the first communication node in this embodiment may be a terminal, and the second communication node may be a base station.

This embodiment further provides a storage medium. The storage medium includes volatile or nonvolatile, removable or non-removable media implemented in any method or technology for storing information (such as computer-readable instructions, data structures, computer program modules, or other data). The storage medium includes, but is not limited to, a random access memory (RAM), a read-only memory (ROM), an electrically erasable programmable read-only memory (EEPROM), a flash memory or other memory technologies, a compact disc read-only memory (CD-ROM), a digital versatile disc (DVD) or other optical disc storage, a magnetic cassette, a magnetic tape, disk storage or other magnetic storage apparatuses, or any other medium that may be used for storing desired information and that can be accessed by a computer.

The storage medium in this embodiment stores one or more first computer programs which are executable by one or more processors to implement the steps of the method for transmitting CSI described in Embodiment one; or the storage medium stores one or more second computer programs which are executable by one or more processors to implement the steps of the method for receiving CSI described in Embodiment two.

This embodiment further provides a computer program (or computer software) which may be distributed on a computer-readable medium and which is executed by a computing apparatus to implement at least one step of the methods described in Embodiment one and Embodiment two. In some circumstances, at least one step illustrated or described may be executed in sequences different from those described in the embodiments described above.

This embodiment further provides a computer program product including a computer-readable apparatus on which the computer programs described above are stored. The computer-readable apparatus in this embodiment may include the computer-readable storage medium described above.

It can be seen that those skilled in the art should understand that functional modules/units in all or part of the steps of the method, the system, and the apparatus disclosed above may be implemented as software (which may be implemented by computer program codes executable by a computing apparatus), firmware, hardware and appropriate combinations thereof. In the hardware implementation, the division of the functional modules/units mentioned above may not correspond to the division of physical components. For example, one physical component may have multiple functions, or one function or step may be performed jointly by several physical components. Some or all physical components may be implemented as software executed by processors such as central processing units, digital signal processors, or microcontrollers, may be implemented as hardware, or may be implemented as integrated circuits such as application-specific integrated circuits.

In addition, as is known to those of ordinary skill in the art, a communication medium generally includes computer-readable instructions, data structures, computer program modules, or other data in modulated data signals such as carriers or other transmission mechanisms and may include any information delivery medium. Therefore, the present disclosure is not limited to any particular combination of hardware and software.

What is claimed is:

1. A method for transmitting channel state information (CSI), comprising:
    decomposing, by a first communication node, a CSI matrix H to obtain a vector group, wherein the vector group comprises at least two vector matrices;
    quantizing element information of at least one vector matrix in the vector group; and
    transmitting the quantized element information,
    wherein quantizing the element information of the at least one vector matrix in the vector group comprises:
    for one of the at least one vector matrix, performing a B-bit quantization on second element information corresponding to each element in the vector matrix based on first element information of the vector matrix to obtain the quantized second element information,
    wherein quantizing the element information of the at least one vector matrix in the vector group comprises:
    quantizing the first element information of the vector matrix based on A bits to obtain the quantized first element information.

2. The method of claim 1, wherein the CSI matrix H is a precoding matrix recommended by the first communication node, or the CSI matrix H is a weighting coefficient matrix for linearly combining codebook base vectors.

3. The method of claim 2, wherein a dimension of the vector matrix is determined by at least one of:
    a number of sub-bands in a feedback bandwidth of the CSI;
    a number of channel state information reference signal (CSI-RS) ports associated with the CSI; or
    a number of the codebook base vectors.

4. The method of claim 1 wherein in a case where the element information comprises amplitude information, the first element information indicates at least one of:
    a maximum value of amplitudes of elements in the vector matrix;
    an average value of amplitudes of elements in the vector matrix;
    a maximum value of amplitudes of elements in each vector unit comprised in the vector matrix;
    an average value of amplitudes of elements in each vector unit comprised in the vector matrix;
    an amplitude value of a weighting coefficient of a strongest codebook base vector; or an amplitude value of a codebook base vector broadband weighting coefficient; and
wherein the second element information comprises at least one of:
    a ratio of an amplitude of each element in the vector matrix to the first element information;
    a difference value between an amplitude of each element in the vector matrix and the first element information;
    a ratio of an amplitude of each element in the vector matrix to first element information corresponding to a vector unit in which each element is located; or
    a difference value between an amplitude of each element in the vector matrix and first element information corresponding to a vector unit in which each element is located,
    wherein in a case where the element information comprises phase information, the first element information indicates at least one of:
    a maximum value of phases of elements in the vector matrix;
    an average value of phases of elements in the vector matrix;
    a maximum value of phases of elements in each vector unit comprised in the vector matrix;
    an average value of phases of elements in each vector unit comprised in the vector matrix;
    a phase value of a weighting coefficient of a strongest codebook base vector; or
    a phase value of a codebook base vector broadband weighting coefficient; and
wherein the second element information comprises at least one of:
    a ratio of a phase of each element in the vector matrix to the first element information;
    a difference value between a phase of each element in the vector matrix and the first element information;
    a ratio of a phase of each element in the vector matrix to first element information corresponding to a vector unit in which each element is located; or
    a difference value between a phase of each element in the vector matrix and first element information corresponding to a vector unit in which each element is located.

5. The method of claim 1, wherein decomposing the CSI matrix H to obtain the vector group comprises:
    directly decomposing the matrix H; or
    dividing a plurality of elements in the matrix H by respective third element information to obtain a matrix $H_0$ corresponding to the matrix H, and decomposing the matrix $H_0$ to obtain the vector group,
    wherein the third element information is obtained according to at least one of the following manners:
        the third element information is obtained according to a number of CSI-RS ports associated with the CSI;
        the third element information is obtained according to a number of sub-bands in a feedback bandwidth of the CSI;
        the third element information is obtained according to a number of codebook base vectors that are subjected to a weighted combination; or
        the third element information is obtained according to weighting coefficient broadband information of a codebook base vector.

6. The method of claim 1, further comprising: determining at least one candidate value in a candidate value set corresponding to element information of each element according to at least one of the following parameters:
    a number N of sub-bands in a feedback bandwidth of the CSI;
    a number $N_T$ of CSI-RS ports associated with the CSI;
    a maximum value d in a set composed of third element information;
    pre-configured configuration information;
    a number L of codebook base vectors that are subjected to a weighted combination; or
    at least one of: a ratio of at least two of the N, the L, the $N_T$ or the d, or a product of at least two of the N, the L, the $N_T$ or the d.

7. The method of claim 1, further comprising: determining at least one candidate value in a candidate value set corresponding to at least one of the first element information, the second element information, the fourth element information or a product of at least two of the first element information, the second element information, element information of each element or the fourth element information according to at least one of the following parameters:

a number N of sub-bands in the feedback bandwidth of the CSI;

a number $N_T$ of CSI-RS ports associated with the CSI;

a maximum value d in a set composed of third element information;

pre-configured configuration information;

a number L of codebook base vectors that are subjected to a weighted combination; or at least one of: a ratio of at least two of the N, the L, the $N_T$ or the d, or a product of at least two of the N, the L, the $N_T$ or the d.

8. The method of claim 1, wherein for a vector unit having a length of G in the vector group, the G being an integer greater than or equal to 2, the element information comprises amplitude information, and the amplitude information comprises a quantized value corresponding to at least one of amplitude information of each element in the vector unit, fifth element information corresponding to the vector unit, sixth element information corresponding to each element in the vector unit or a product of at least two of the amplitude information of each element, the fifth element information or the sixth element information, wherein the quantized value comprises at least one of the following values:

$J \cdot \cos \theta_1$;

$J \cdot \cos \theta_m \Pi_{i=1}^{m-1} \sin \theta_i$, wherein the m is at least one of $\{2, \ldots, G-1\}$; or $J \cdot \sin \theta_{G-1} \Pi_{i=1}^{G-2} \sin \theta_i$, wherein the J is a constant greater than or equal to 0, and a value range of each angle in $\{\theta_1, \ldots, \theta_{G-1}\}$ is $[0, 2\pi]$;

wherein quantizing element information of at least one vector matrix in the vector group comprises:

quantizing the each angle in $\{\theta_1, \ldots, \theta_{G-1}\}$;

wherein the fifth element information indicates at least one of:

a maximum value of amplitudes of elements in the vector unit; or an average value of amplitudes of elements in the vector unit; and wherein the sixth element information indicates at least one of:

a ratio of an amplitude of each element in the vector unit to the fifth element information; or a difference value between an amplitude of each element in the vector unit and the fifth element information.

9. An apparatus for transmitting channel state information (CSI), comprising:

a processor and a memory storing processor-executable instructions which, when executed by the processor, are configured to implement the method of claim 1.

10. A method for receiving channel state information (CSI), comprising:

receiving, by a second communication node, quantized element information, wherein the element information is information corresponding to an element in at least one vector matrix in a vector group obtained by decomposing by a first communication node a CSI matrix H, and the vector group comprises at least two vector matrices; and restoring the quantized element information to obtain the CSI matrix H wherein receiving, by the second communication node, the quantized element information comprises:

receiving, by the second communication node, quantized second element information, wherein the quantized second element information is obtained by performing a B-bit quantization by the first communication node on second element information corresponding to each element in the vector matrix based on first element information of at least one vector matrix, wherein receiving, by the second communication node, the quantized element information comprises:

receiving, by the second communication node, quantized first element information, wherein the quantized first element information is obtained by performing an A-bit quantization by the first communication node on the first element information of at least one vector matrix.

11. The method of claim 10, wherein the CSI matrix H is a precoding matrix recommended by the first communication node, or the CSI matrix H is a weighting coefficient matrix for linearly combining codebook base vectors.

12. The method of claim 10, wherein in a case where the element information comprises amplitude information, the first element information indicates at least one of:

a maximum value of amplitudes of elements in the vector matrix;

an average value of amplitudes of elements in the vector matrix;

a maximum value of amplitudes of elements in each vector unit comprised in the vector matrix;

an average value of amplitudes of elements in each vector unit comprised in the vector matrix;

an amplitude value of a weighting coefficient of a strongest codebook base vector; or an amplitude value of a codebook base vector broadband weighting coefficient; and wherein the second element information comprises at least one of:

a ratio of an amplitude of each element in the vector matrix to the first element information;

a difference value between an amplitude of each element in the vector matrix and the first element information;

a ratio of an amplitude of each element in the vector matrix to first element information corresponding to a vector unit in which each element is located; or a difference value between an amplitude of each element in the vector matrix and first element information corresponding to a vector unit in which each element is located, wherein in a case where the element information comprises phase information, the first element information indicates at least one of:

a maximum value of phases of elements in the vector matrix;

an average value of phases of elements in the vector matrix;

a maximum value of phases of elements in each vector unit comprised in the vector matrix;

an average value of phases of elements in each vector unit comprised in the vector matrix;

a phase value of a weighting coefficient of a strongest codebook base vector; or a phase value of a codebook base vector broadband weighting coefficient; and wherein the second element information comprises at least one of:

a ratio of a phase of each element in the vector matrix to the first element information;
a difference value between a phase of each element in the vector matrix and the first element information;
a ratio of a phase of each element in the vector matrix to first element information corresponding to a vector unit in which each element is located; or
a difference value between a phase of each element in the vector matrix and first element information corresponding to a vector unit in which each element is located.

13. The method of claim 10, wherein the vector group is obtained by directly decomposing the matrix H by the first communication node; or the vector group is obtained by decomposing a matrix $H_0$ by the first communication node, wherein the matrix $H_0$ is obtained by dividing by the first communication node a plurality of elements in the matrix H by respective third element information,
wherein the third element information is obtained according to at least one of the following manners:
the third element information is obtained according to a number of channel state information reference signal (CSI-RS) ports associated with the CSI;
the third element information is obtained according to a number of sub-bands in a feedback bandwidth of the CSI;
the third element information is obtained according to a number of codebook base vectors that are subjected to a weighted combination; or
the third element information is obtained according to weighting coefficient broadband information of a codebook base vector.

14. The method of claim 10, further comprising: determining at least one candidate value in a candidate value set corresponding to element information of each element according to at least one of the following parameters:
a number N of sub-bands in the feedback bandwidth of the CSI;
a number $N_T$ of CSI-RS ports associated with the CSI;
a maximum value d in a set composed of third element information;
pre-configured configuration information;
a number L of codebook base vectors that are subjected to a weighted combination; or
at least one of: a ratio of at least two of the N, the L, the $N_T$ or the d, or a product of at least two of the N, the L, the $N_T$ or the d.

15. The method of claim 10 further comprising: determining at least one candidate value in a candidate value set corresponding to at least one of the first element information, the second element information, the fourth element information or a product of at least two of the first element information, the second element information, element information of each element or the fourth element information according to at least one of the following parameters:
a number N of sub-bands in the feedback bandwidth of the CSI;
a number $N_T$ of CSI-RS ports associated with the CSI;
a maximum value d in a set composed of third element information;
pre-configured configuration information;
a number L of codebook base vectors that are subjected to a weighted combination; or
at least one of: a ratio of at least two of the N, the L, the $N_T$ or the d, or a product of at least two of the N, the L, the $N_T$ or the d.

16. The method of claim 10, wherein for a vector unit having a length of G in the vector group, the G being an integer greater than or equal to 2, the element information comprises amplitude information, and a value of at least one of amplitude information of each element in the vector unit, fifth element information corresponding to the vector unit, sixth element information corresponding to each element in the vector unit or a product of at least two of the amplitude information of each element, the fifth element information or the sixth element information is at least one of the following values:
$J\cdot\cos\theta_1$;
$J\cdot\cos\theta_m \Pi_{i=1}^{m-1} \sin\theta_i$, wherein the m is at least one of $\{2, \ldots, G-1\}$; or
$J\cdot\sin\theta_{G-1} \Pi_{i=1}^{G-2} \sin\theta_i$,
wherein the J is a constant greater than or equal to 0, and a value range of each angle in $\{\theta_1, \ldots, \theta_{G-1}\}$ is $[0, 2\pi]$;
wherein the fifth element information indicates at least one of:
a maximum value of amplitudes of elements in the vector unit; or
an average value of amplitudes of elements in the vector unit; and
wherein the sixth element information indicates at least one of:
a ratio of an amplitude of each element in the vector unit to the fifth element information; or
a difference value between an amplitude of each element in the vector unit and the fifth element information.

17. An apparatus for receiving channel state information (CSI), comprising:
a processor and a memory storing processor-executable instructions which, when executed by the processor, are configured to implement the method of claim 10.

18. A communication node, comprising a processor, a memory, and a communication bus;
wherein the communication bus is configured to implement connection and communication between the processor and the memory; and
the processor is configured to execute one or more first computer programs stored in the memory to implement the method of claim 1, or execute one or more second computer programs stored in the memory to implement the method of claim 10.

* * * * *